(12) United States Patent
Goda

(10) Patent No.: US 8,520,258 B2
(45) Date of Patent: Aug. 27, 2013

(54) IMAGE FORMING APPARATUS, AND CONTROL METHOD AND STORAGE MEDIUM THEREFOR

(75) Inventor: Junichi Goda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 171 days.

(21) Appl. No.: 13/158,553

(22) Filed: Jun. 13, 2011

(65) Prior Publication Data
US 2011/0317191 A1 Dec. 29, 2011

(30) Foreign Application Priority Data
Jun. 28, 2010 (JP) .................. 2010-146370

(51) Int. Cl.
*H04N 1/60* (2006.01)
*H04N 1/36* (2006.01)
(52) U.S. Cl.
USPC ............ 358/1.9; 358/1.13; 358/410; 358/409
(58) Field of Classification Search
None
See application file for complete search history.

(56) References Cited

U.S. PATENT DOCUMENTS

| 5,199,081 A * | 3/1993 | Saito et al. ................... 382/116 |
| 7,158,163 B2 * | 1/2007 | Komiya et al. ............... 347/224 |
| 2003/0112317 A1 * | 6/2003 | Murakami ..................... 347/116 |
| 2006/0203263 A1 * | 9/2006 | Komiya et al. ................ 358/1.7 |

FOREIGN PATENT DOCUMENTS

JP 2006-069063 A 3/2006

* cited by examiner

*Primary Examiner* — Dov Popovici
(74) *Attorney, Agent, or Firm* — Rossi, Kimms & McDowell LLP

(57) ABSTRACT

An image forming apparatus capable of performing control so as to prevent a line registration error from occurring, even if a timing to start counting a positional deviation becomes different between color plane images. A BD identification unit of the image forming apparatus identifies whether a main scanning sync signal is a sync signal for odd-numbered line or for even-numbered line, and outputs a first or second timing edge signal. According to the timing edge signal, a sub-scan timing controller controls an output timing of an image signal to a printer controller. When the top of a page is detected based on the timing edge signal first input from the BD identification unit, the sub-scan timing controller is made enabled. If the first timing edge signal is subsequently input, the image signal output timing is controlled according to the second timing edge signal which is next input.

9 Claims, 25 Drawing Sheets

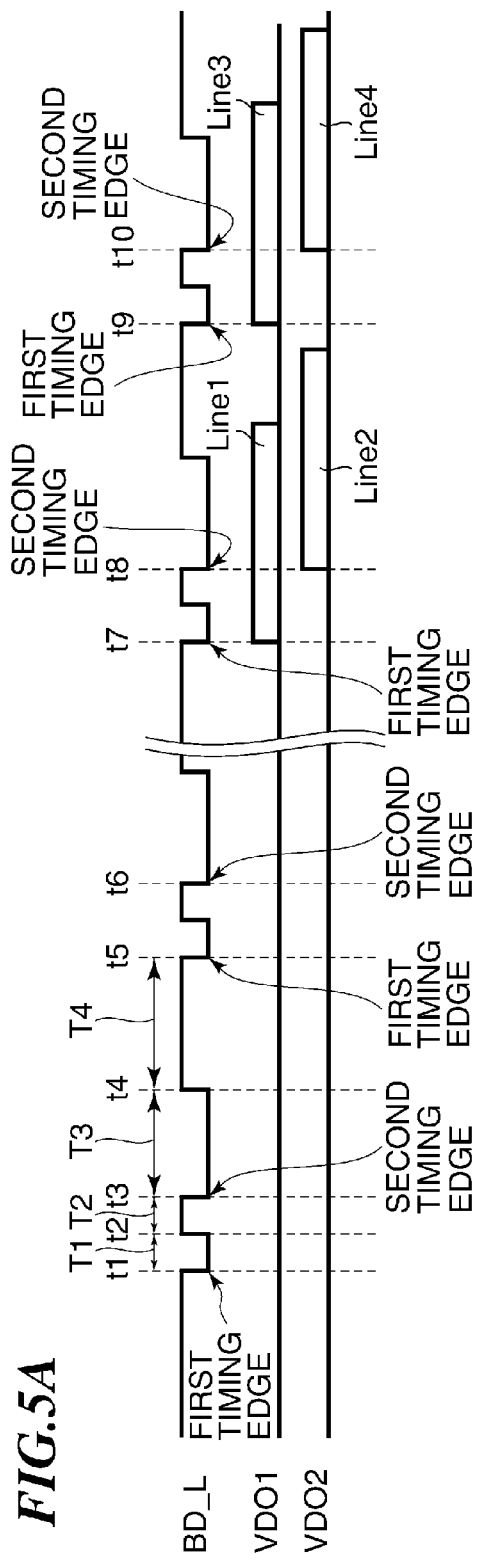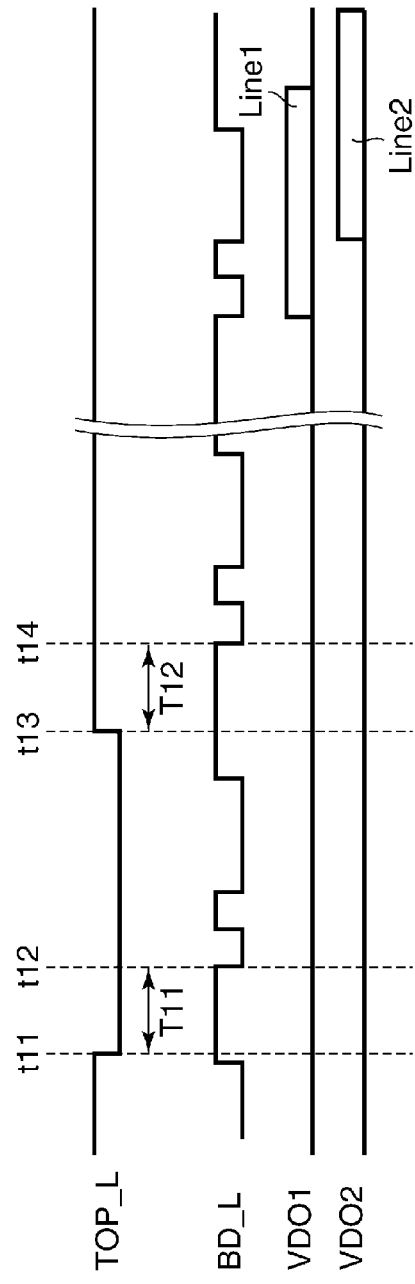

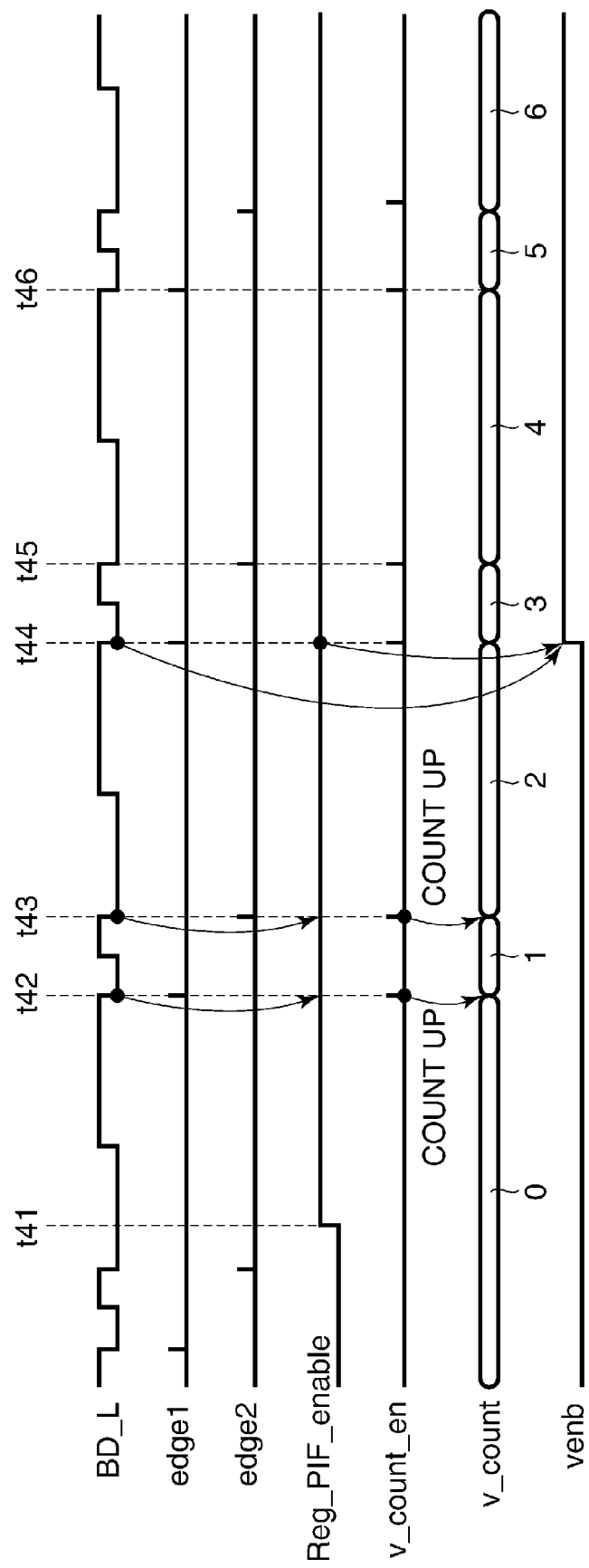

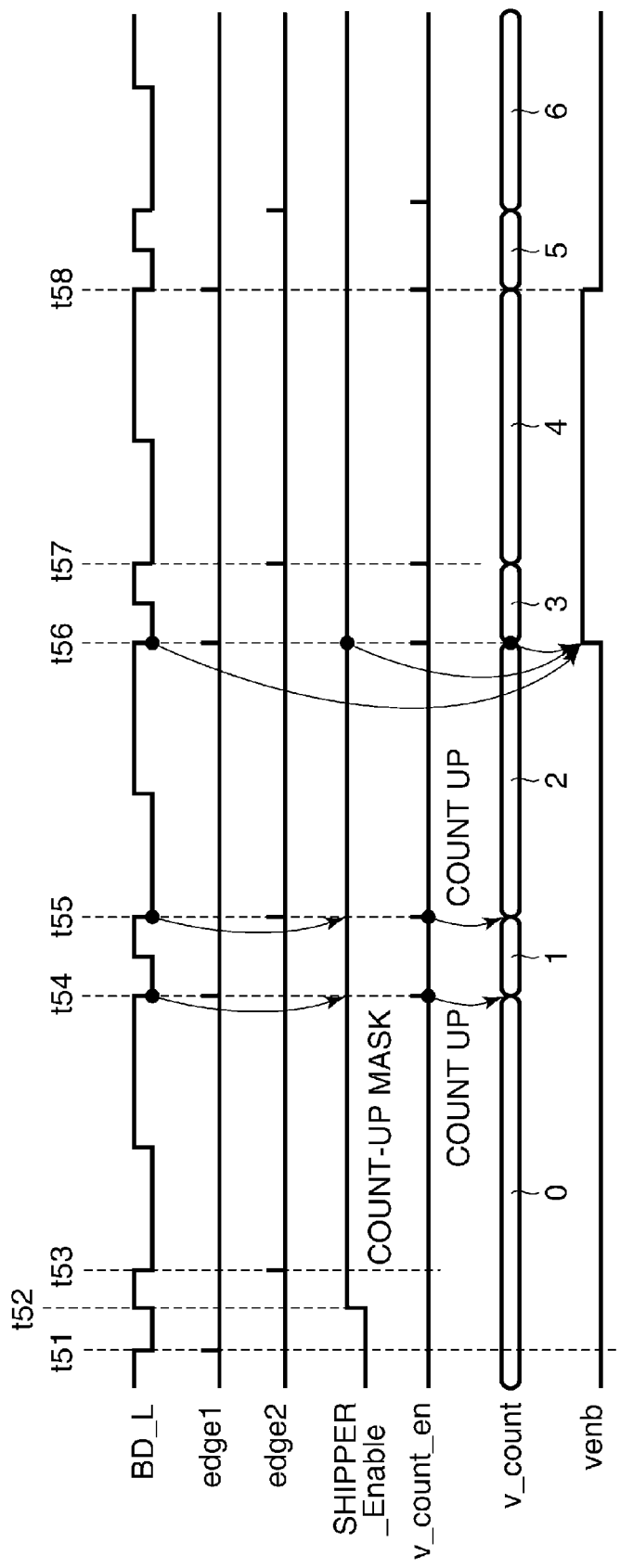

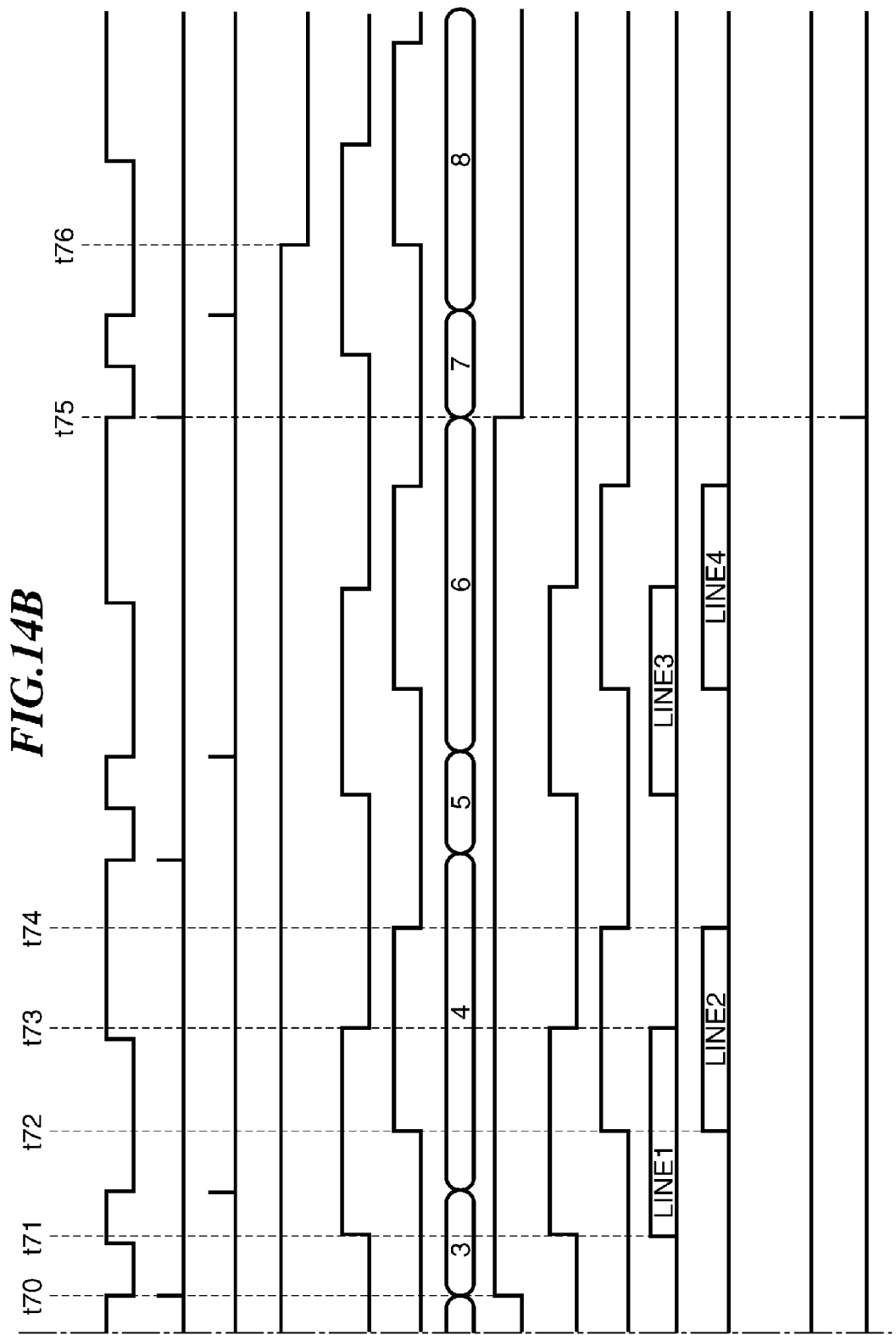

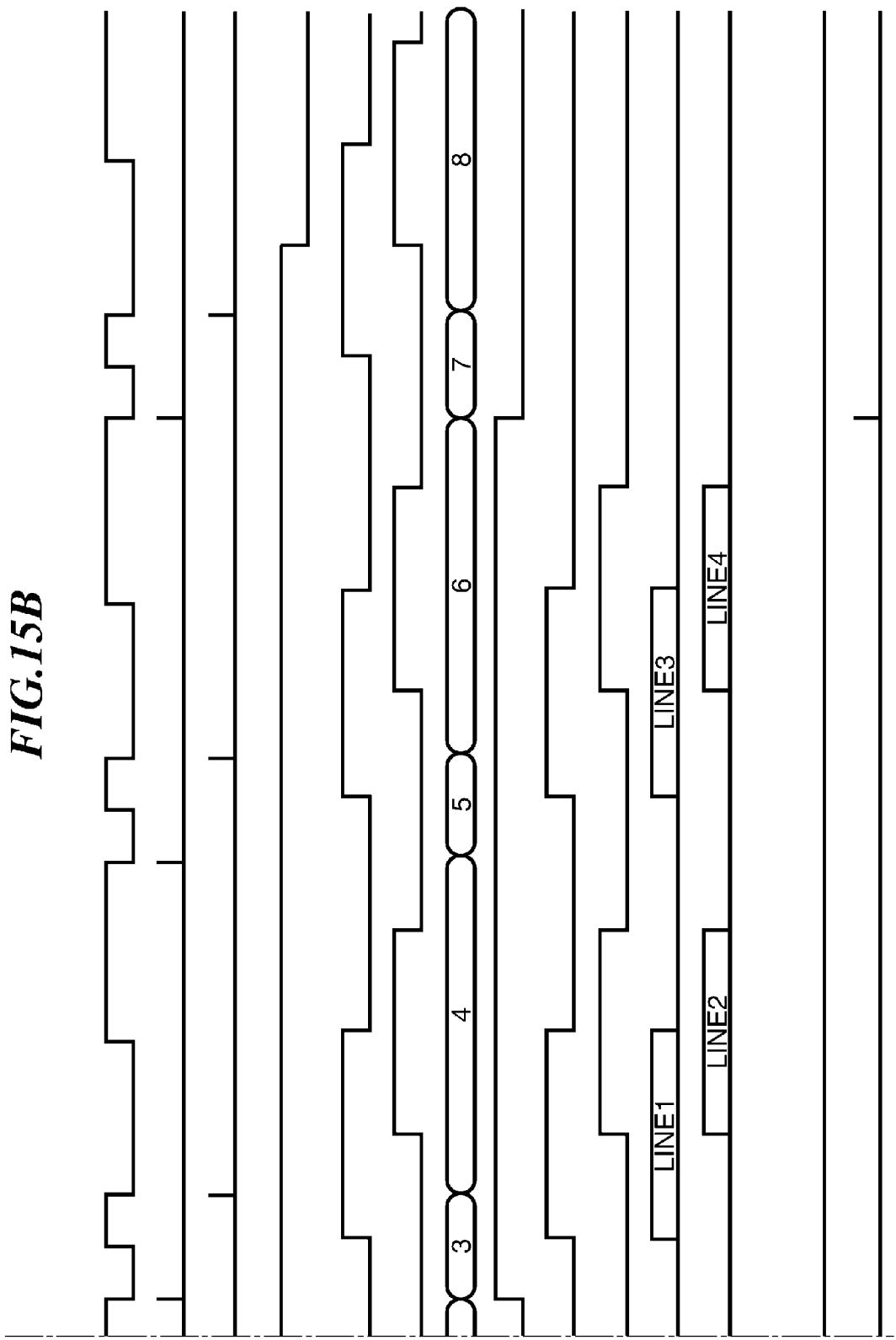

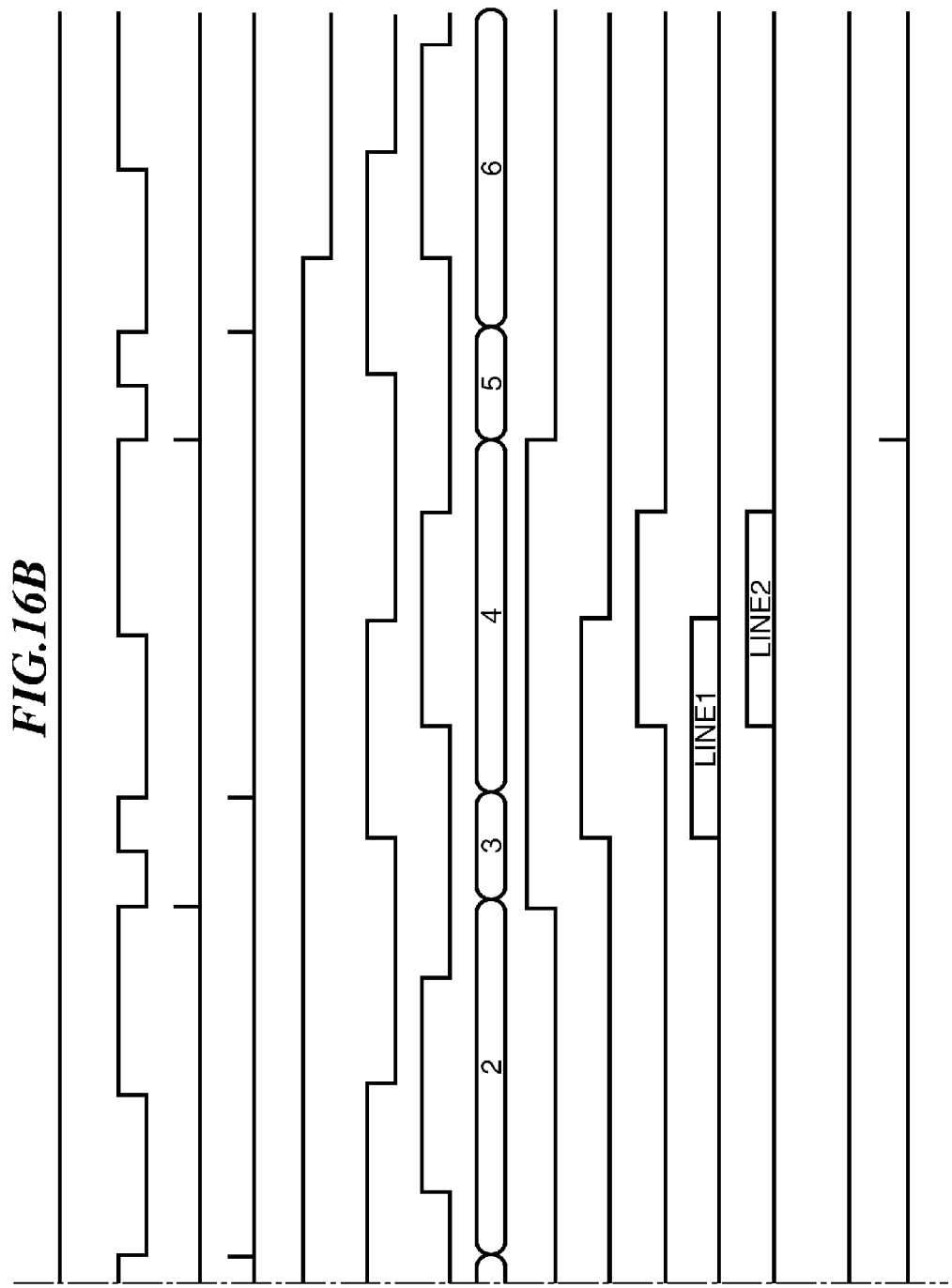

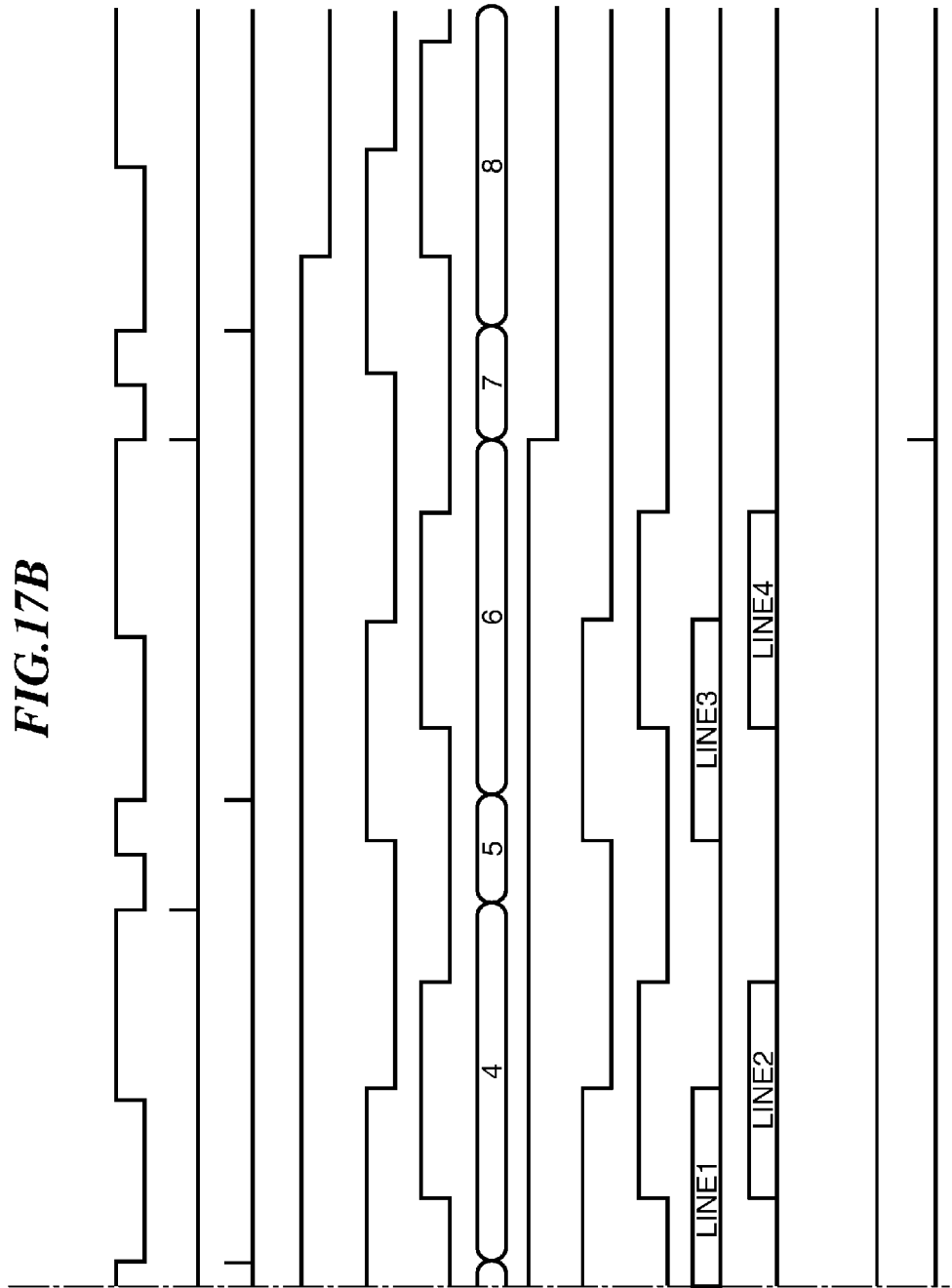

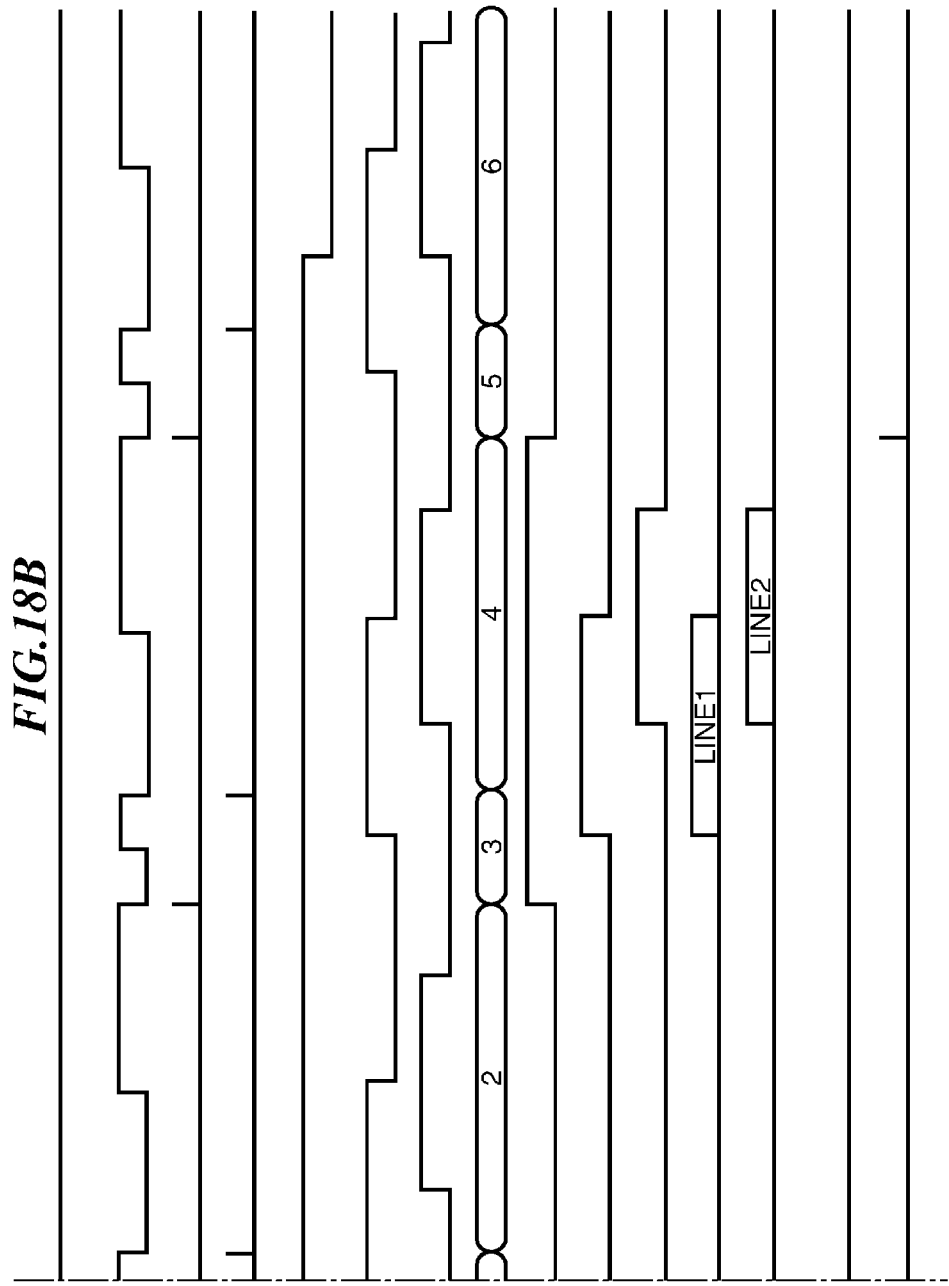

IMAGE FORMING APPARATUS, AND CONTROL METHOD AND STORAGE MEDIUM THEREFOR

BACKGROUND OF THE INVENTION

1. Field of the Invention

The preset invention relates to an image forming apparatus that transfers onto a recording sheet plural color toner images formed by developing units, and relates to a control method and a storage medium therefor.

2. Description of the Related Art

An image forming apparatus such as a copier or a printer includes a main controller for controlling the entire apparatus and a printer controller for controlling a printing unit. In synchronism with a sub-scanning sync signal and a main scanning sync signal which are output from the printer controller, the main controller outputs an image signal (video signal) to the printing unit, to thereby control image printing timings in a sub-scanning direction and in a main scanning direction. In the case of color printing, output timings of the sub-scanning and main scanning sync signals are controlled for adjustment of image writing start positions and for prevention of occurrences of color misalignment.

There has been proposed in, e.g., Japanese Laid-open Patent Publication No. 2006-069063, a method for controlling image writing start positions for respective colors in an image forming apparatus having photosensitive drums and laser units. In this control method, a positional deviation of each beam in the sub-scanning direction is received from the printer controller, and according to the received deviation, a start timing of image output from the main controller is controlled on a per beam basis, so as to reduce the positional deviations of respective beams in the sub-scanning direction.

There is another method for controlling an image writing start position in the sub-scanning direction. In this method, a positional deviation in the sub-scanning direction is counted by counting the main scanning sync signal after the top of a page is detected based on the sub-scanning sync signal, and image output for the next line is started after completion of counting the positional deviation.

With these conventional control methods, however, if a timing in which the main controller starts counting the positional deviation is different between respective beams, a line registration error is caused, even if control is made according to acquired positional deviations in the sub-scanning direction for respective colors. A printed image in which a line registration error is caused is shown in FIG. 19. As illustrated, cyan (C), magenta (M), yellow (Y), and black (K) color plane images are printed on an A4 sheet, and printing timings in the sub-scanning direction are deviated by one line.

SUMMARY OF THE INVENTION

The present invention provides an image forming apparatus capable of performing control so as to prevent a line registration error from occurring, even if a timing to start counting a positional deviation becomes different between color plane images, and provides a control method and a storage medium therefor.

According to a first aspect of this invention, there is provided an image forming apparatus comprising an image forming unit configured to expose and scan in lines across a single photosensitive body with plural light beams based on an image signal, thereby forming an electrostatic latent image on the photosensitive body, and configured to develop the electrostatic latent image and transfer a developed image onto a transfer member, thereby forming an image on the transfer member, an identification unit configured to identify whether a main scanning sync signal is a sync signal for light beam for odd-numbered line or a sync signal for light beam for even-numbered line and output an identification signal, a control unit configured to control an output timing of the image signal to the image forming unit according to the identification signal output from the identification unit, a detection unit configured to detect, as page top, an identification signal input first from the identification unit, and an enabling unit configured to make the control unit enabled when the page top is detected by the detection unit, wherein in a case where an identification signal input from the identification unit after the control unit is made enabled by the enabling unit is an identification signal representing the sync signal for light beam for even-numbered line, the control unit controls the output timing of the image signal according to an identification signal representing the sync signal for next input light beam for odd-numbered line.

According to a second aspect of this invention, there is provided a control method for the image forming apparatus described in the first aspect.

According to a third aspect of this invention, there is provided a storage medium storing a program for executing the control method described in the second aspect.

With this invention, it is possible to perform control so as to prevent a line registration error from occurring, even if a timing to start counting a positional deviation becomes different between color plane images.

Further features of the present invention will become apparent from the following description of exemplary embodiments with reference to the attached drawings.

BRIEF DESCRIPTION OF THE DRAWINGS

FIGS. 5A and 5B are timing charts of various signals exchanged between the main controller and the printer controller, where FIG. 5A shows a case where there is no TOP_L signal representing the top of a page and FIG. 5B shows a case where there is a TOP_L signal;

FIG. 12A is a timing chart showing operation of the sub-scan timing controller in a case where a Reg_PIF_enable is asserted during a time period from a second timing edge of a main scanning sync signal to a first timing edge thereof;

FIG. 12B is a timing chart showing operation of the sub-scan timing controller in a case where the Reg_PIF_enable is asserted during a time period from a first timing edge to a second timing edge of the main scanning sync signal;

FIGS. 14A and 14B are a timing chart of various signals associated with processing, from page top detection to image output, in a case where there is no TOP_L signal and the Reg_PIF_enable is asserted during a time period from a second timing edge to a first timing edge of the main scanning sync signal;

FIGS. 15A and 15B are a timing chart of various signals associated with processing, from page top detection to image output, in a case where there is no TOP_L signal and the Reg_PIF_enable is asserted during a time period from a first timing edge to a second timing edge of the main scanning sync signal;

FIGS. 16A and 16B are a timing chart of various signals associated with processing from page top detection to image output in a second embodiment of this invention;

FIGS. 17A and 17B are a timing chart of various signals associated with processing from page top detection to image output in a third embodiment of this invention in a case where there is no TOP_L signal;

FIGS. 18A and 18B are a timing chart of various signals associated with processing from page top detection to image output in the third embodiment in a case where there is a TOP_L signal.

DESCRIPTION OF THE EMBODIMENTS

The present invention will now be described in detail below with reference to the drawings showing preferred embodiments thereof.

First Embodiment

Figure 1:
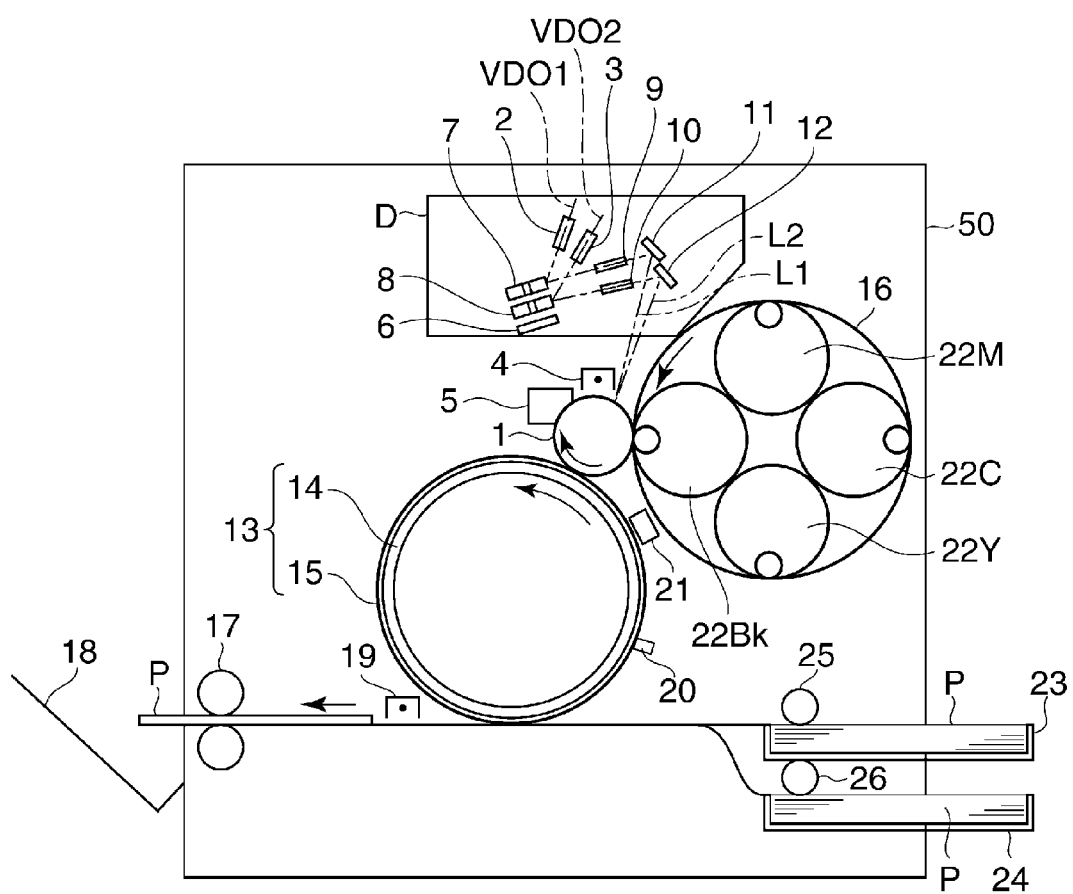
FIG. 1 is a vertical section view schematically showing the construction of a printer, which is an image forming apparatus according to embodiments of this invention.

FIG. 1 schematically shows in vertical section the construction of an image forming apparatus according to embodiments of this invention.

Referring to FIG. 1, the image forming apparatus is configured as a printer 50. The printer 50 includes a photosensitive drum (photosensitive body) 1 uniformly charged by a charger 4, and includes an optical unit D (drawing unit of the printer 50). Reference numerals 2, 3 denote first and second laser units incorporating optical lenses, 6 denotes a scanner motor, and 7, 8 denote first and second polygon mirrors rotated by the scanner motor 6. Reference numerals 9, 10 denote first and second lenses for distortion correction, and 11, 12 denote first and second mirrors for beam reflection. The optical unit D can easily be detachably mounted to a main body of the printer.

A first light beam L1 on-off modulated according to a first image signal (hereinafter, referred to as the VDO1 signal) is output from the first laser unit 2, is reflected by the first polygon mirror 7, and is irradiated onto the photosensitive drum 1 through the first lens 9 and the first mirror 11. A second light beam L2 on-off modulated according to a second image signal (hereinafter, referred to as the VDO2 signal) is output from the second laser unit 3, is reflected by the second polygon mirror 8, and is irradiated onto the photosensitive drum 1 through the second lens 10 and the second mirror 12.

Reference numerals 22M, 22C, 22Y and 22Bk denote first to fourth developing devices by which first to fourth electrostatic latent images (that are sequentially formed on the photosensitive drum 1 as described later) are developed into magenta, cyan, yellow, and black toner images (first to fourth toner images), respectively. The developing devices 22M, 22C, 22Y and 22Bk constitute a developing unit 16.

Reference numerals 23, 24 denote sheet feed cassettes in which recording sheets P are stored. Recording sheets P are fed one by one from a selected one of the sheet feed cassettes by a corresponding sheet feed roller 25 or 26. Reference numeral 13 denotes a transfer drum (transfer member) that is constituted by a support member 14 and a film 15. Reference numeral 5 denotes a cleaner for scraping off untransferred toner at each completion of a transfer process, and 17 denotes a fixing unit for heating and pressurizing a toner image transferred onto a recording sheet P, whereby a permanent image is formed on the sheet. Reference numeral 18 denotes a sheet discharge tray on which recording sheets P each formed with an image are stacked, and 19 denotes a charger.

Reference numeral 20 denotes a shield plate for use as a reference for determining a print timing on the transfer drum 13, and 21 denotes a photointerrupter. Since the shield plate 20 is disposed on the transfer drum 13 so as to intercept an optical path to the photointerrupter 21, a sub-scanning direction reference signal is output from the photointerrupter 21 at each revolution of the transfer drum 13. The sub-scanning direction reference signal is supplied, as a printing start signal and a printing operation reference signal, to a printer controller 130 and a main controller 100 (which will be described later).

The following is a description of an image formation sequence.

First, the photosensitive drum 1 is charged by the charger 4 at a predetermined voltage and with a predetermined polarity. Next, the photosensitive drum 1 is exposed and scanned by first and second light beams L1, L2 respectively modulated by VDO1 and VDO2 signals, whereby a first electrostatic latent image is formed. Then, the first latent image is developed by the developing device 22M, so that a first toner image in magenta is formed on the photosensitive drum 1. A predetermined transfer bias voltage with a polarity opposite from that of the photosensitive drum 1 is applied to the transfer drum 13, whereby the first toner image is transferred to the film 15 of the transfer drum 13.

Next, first and second light beams L1, L2 are irradiated onto the photosensitive drum 1, whereby a second electrostatic latent image is formed. The second latent image is developed by the developing device 22C, so that a second toner image in cyan is formed on the photosensitive drum 1. The second toner image is transferred to the same position on the film 15 of the transfer drum 13 as that to which the first toner image has been transferred.

Similarly, third and fourth latent images are formed on the photosensitive drum 1 and developed by the developing devices 22Y, 22Bk, and resultant yellow and black toner images are transferred to the film 15 of the transfer drum 13.

Next, the toner images in four colors on the film 15 of the transfer drum 13 are collectively transferred to the recording sheet P fed in a predetermined timing, thereby forming a toner image in four colors on the recording sheet P. Subsequently, the recording sheet P onto which the toner image in four colors has been transferred is separated from the transfer drum 13. The charger 19 removes charges accumulated on the recording sheet P, thereby reducing aerial discharge at the time of the retransfer/separation.

Figure 2:
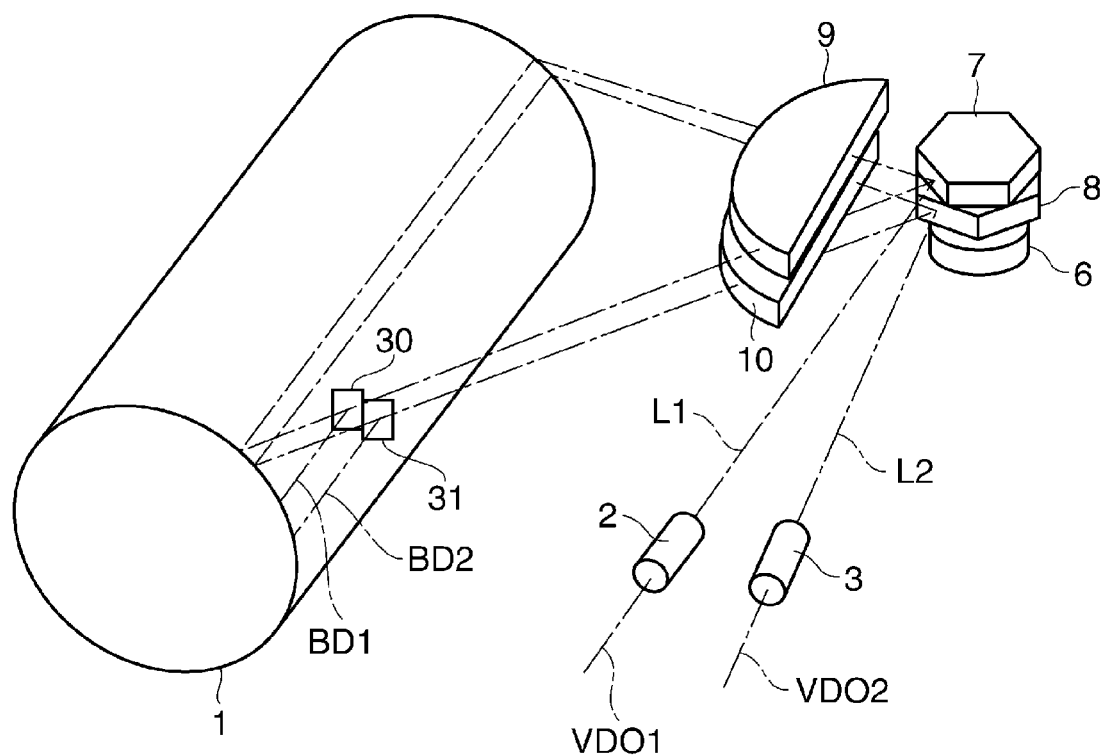
FIG. 2 is a perspective view schematically showing the construction of an optical unit of the printer.

FIG. 2 schematically shows the construction of the optical unit D in perspective view. In FIG. 2, an illustration of the first and second mirrors 11, 12 shown in FIG. 1 is omitted.

As illustrated in FIG. 2, the first light beam L1 emitted from the first laser unit 2 is reflected by the first polygon mirror 7, which is rotatably driven at a constant speed by the scanner motor 6. The reflected light beam L1 passes through the first lens 9 and is exposed and scanned on the photosensitive drum 1 in the main scanning direction (i.e., the axial direction of the photosensitive drum 1). Similarly, the second light beam L2 emitted from the second laser unit 3 is reflected by the second polygon mirror 8 rotatably driven at the constant speed by the scanner motor 6, passes through the second lens 10, and is exposed and scanned on the photosensitive drum 1 in the main scanning direction. The first and second polygon mirrors 7, 8 are disposed in a stacked relation in a rotation axis direction with an angular deviation, so that the light beams L1, L2 are deflected and scanned on the photosensitive drum 1 with a predetermined time difference.

First and second BD detection units 30, 31 each implemented by, e.g., a pin photodiode are disposed near main-scanning start positions of the first and second light beams L1, L2. The first and second BD detection units 30, 31 convert the first and second light beams L1, L2 into electrical signals and perform thereon waveform shaping, amplification, etc., thereby generating and outputting main scanning direction sync signals (hereinafter, referred as the BD1 and BD2 signals) for the VDO1 and VDO2 signals (first and second image signals), respectively.

Figure 3:
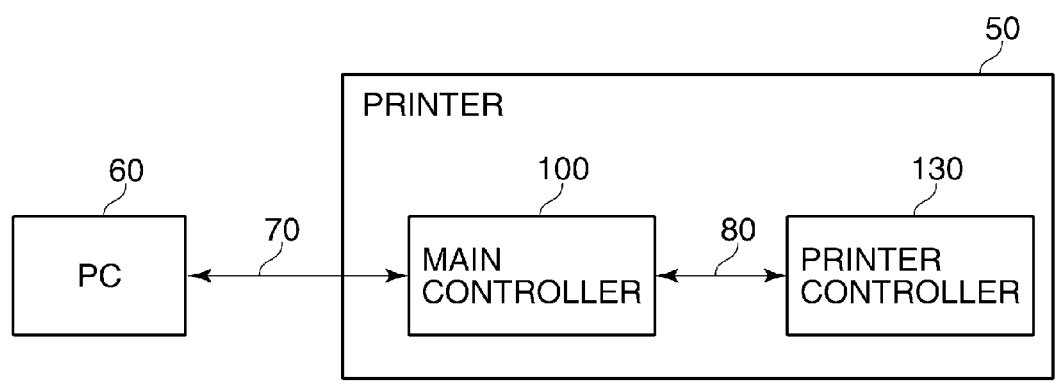
FIG. 3 is a block diagram showing an example construction of an image forming system including the printer.

FIG. 3 shows in block diagram an example construction of an image forming system including the printer 50.

The printer 50 includes a main controller 100 and a printer controller 130, and is connected through a communication line 70 such as a LAN or a USB cable to a personal computer (PC) 60 as a host device.

The main controller 100 mainly performs input and output of image data. For example, the main controller 100 receives a print job from the PC 60, performs image processing on image data, and outputs the processed image data to the printer controller 130. The main controller 100 also receives from the PC 60 a control command for status confirmation or for mode setting, and performs control according to the received control command. The printer controller 130 controls printing of image data received from the main controller 100 via an internal communication I/F 80, and controls the respective parts of the printer shown in FIGS. 1 and 2.

Figure 4:
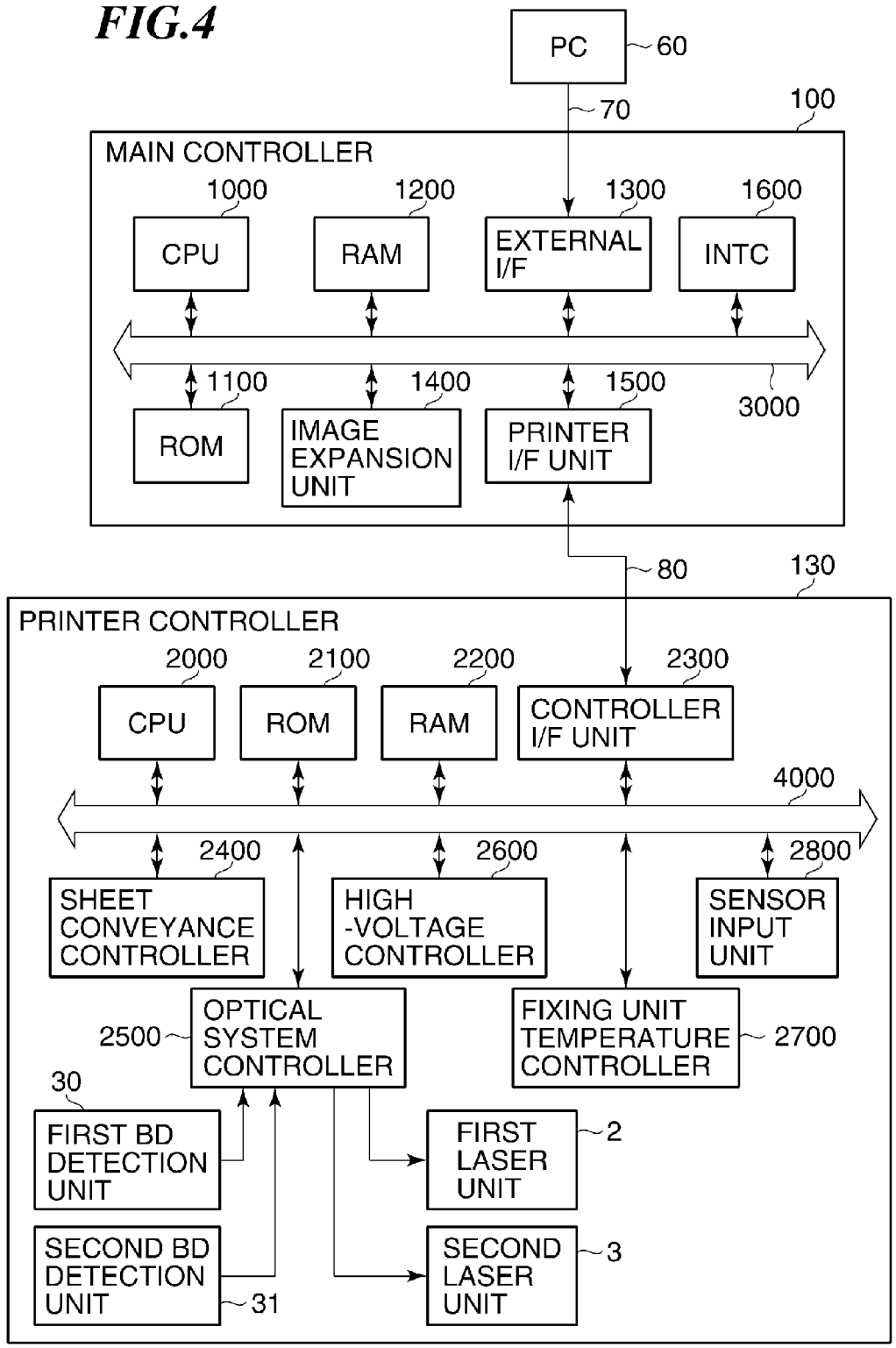
FIG. 4 is a block diagram showing functional structures of a main controller and a printer controller of the printer.

FIG. 4 shows, in block diagram, functional structures of the main controller 100 and the printer controller 130.

First, a description is given of the main controller 100.

A printer I/F unit 1500 of the main controller 100 is connected through the internal communication I/F 80 to a controller I/F unit 2300 of the printer controller 130, which is an image output control unit. An external I/F 1300 (communication interface) is connected to the PC 60 through the communication line 70. The main controller 100 inputs from and outputs to the PC 60 image data and device information.

A CPU 1000 controls the entire main controller 100. A ROM 1100 is a boot ROM and stores a boot program for the main controller 100, application software, etc. A RAM 1200 is a system work memory used by the CPU 1000 for its operation and is also used as an image memory for temporary storage of image data. An image expansion unit 1400 has a function of expanding compressed image data.

The main controller 100 inputs a main scanning sync signal (BD_L signal) and a sub-scanning sync signal (TOP_L signal) from the printer controller 130 through the internal communication I/F 80. If there is no TOP_L signal, a first BD_L signal assert is used as the sub-scanning sync signal.

The main controller 100 outputs to the printer controller 130 a VDO1 signal (image data for an odd-numbered line in the sub-scanning direction) and a VDO2 signal (image data for an even-numbered line in the sub-scanning direction). Although not shown, there is provided a serial interface for communication between the main controller 100 and the printer controller 130, so that communication states and commands can be exchanged therebetween.

An INTC 1600 inputs an interrupt signal from any of respective parts of the main controller 100 which are connected to an internal bus 3000, detects an assertion of the interrupt signal, and notifies the CPU 1000 of the interrupt signal. As a method for interrupt detection by the INTC 1600, interrupt mask control or the like is known.

Next, a description is given of the printer controller 130.

A CPU 2000 controls the entire printer controller 130. A ROM 2100 is a boot ROM and stores a boot program for the printer controller 130, application software, etc. A RAM 2200 is a system work memory used by the CPU 2000 for its operation. A controller I/F unit 2300 is connected through the internal communication I/F 80 to the printer I/F unit 1500 of the main controller 100. VDO1 and VDO2 signals received from the main controller 100 through the I/F 80 are directly input to the first and second laser units 2, 3. A controller I/F unit 2300 has a function of notifying the CPU 2000 of a command received from the main controller 100.

When receiving a request for print from the CPU 2000, a sheet conveyance controller 2400 controls recording sheet conveyance, starting from feeding a recording sheet from the sheet cassette 23 or 24 to discharging the recording sheet to the sheet discharge tray 18. An optical system controller 2500 causes the first and second laser units 2, 3 to emit light according to VDO1 and VDO2 signals (image data) received from the main controller 100. The controller 2500 causes the scanner motor 6 to rotate the first and second polygon mirrors 7, 8, and receives BD1 and BD2 signals from the first and second BD detection units 30, 31. The received BD1 and BD2 signals are shaped into a BD_L signal that is transmitted through the internal communication I/F 80 to the main controller 100. Transmission timing of the BD_L signal will be described later with reference to FIGS. 5A and 5B.

According to instructions given from the CPU 2000, a high-voltage controller 2600 outputs high-voltage outputs for charging, development, and transfer, and a fixing unit temperature controller 2700 controls the temperature of the fixing unit 17 to a predetermined temperature. A sensor input unit 2800 includes the photointerrupter 21 for outputting a sub-scanning direction reference signal and a sheet discharge sensor (not shown) for detecting the presence/absence of a sheet in a conveyance path. The sub-scanning direction reference signal output from the photointerrupter 21 is shaped into a TOP_L signal shown in FIG. 5B (described later) and then transmitted through the internal communication I/F 80 to the main controller 100. If the main controller 100 does not have a port for receiving the TOP_L signal, the sub-scanning direction reference signal is not used. The respective parts of the printer controller 130 are connected to an internal bus 4000.

A printing operation to be performed in response to a command or a signal supplied from the main controller 100 is started according to instructions given from the CPU 2000 to the respective controllers.

FIGS. 5A and 5B are timing charts of various signals exchanged between the main controller 100 and the printer controller 130, where FIG. 5A shows a case where there is no sub-scanning sync signal (TOP_L signal) representing the top of a page and FIG. 5B shows a case where there is a TOP_L signal.

First, with reference to FIGS. 5A and 5B, a description will be given of the meanings of signals exchanged between the controllers 100 and 130.

The TOP_L signal is a sub-scanning sync signal for setting an exposure scanning position on the photosensitive drum 1 in the sub-scanning direction. The BD_L signal is a main scanning sync signal for setting an exposure scanning position on the photosensitive drum 1 in the main scanning direction. In a case where there is no TOP_L signal, a BD_L signal assert which is detected for the first time by the main controller 100 is used as a sub-scanning sync signal representing the top of a page.

As previously described, the VDO1 signal is image data for an odd-numbered line and is output to the first laser unit 2, and the VDO2 signal is image data for an even-numbered line and is output to the second laser unit 3.

Next, a description will be given of timings of the signals exchanged between the controllers 100 and 130.

Referring to FIG. 5A, the BD1 signal falls at times t1, t3, t5 to t10 and so on, and rises at times t2, t4 and so on. In the following, falling edges of the BD_L signal detected at the times t1, t5, t7, t9 and so on will be referred to as the first timing edges of the BD_L signal, and falling edges of the BD_L signal detected at the times t3, t6, t8, t10 and so on will be referred to as the second timing edges of the BD_L signal.

A time period T1 from t1 to t2 is 200 to 500 nsec, a time period T2 from t2 to t3 is 100 to 600 nsec, a time period T3 from t3 to t4 is 400 to 700 μsec, and a time period T4 from t4 to t5 is 100 to 300 μsec. In other words, a time period from the first timing edge to the second timing edge of the BD_L signal, T1+T2, is in the order of nsec, whereas a time period from the second timing edge to the next first timing edge of the BD_L signal, T3+T4, is in the order of μsec. These two time periods are largely different in length from each other. It should be noted that the above-mentioned numeric ranges are an example and are not limitative.

Based on the main scanning sync signal (BD_L signal), the main controller 100 of the printer 50 starts outputting effective image data (VDO1 and VDO2 signals) to the printer controller 130 from a predetermined N-th line (corresponding to the time t7 in this embodiment) counted from the top of a page (corresponding to the time t1).

Referring to FIG. 5B, the TOP_L signal falls at a time t11 and rises at a time t13. The first rising edge of the BD_L signal is ahead of the falling edge of the TOP_L signal (time t11) that represents the top of a page. The first timing edge of the BD_L signal occurs at a time t12. A time period T11 from t11 to t12 is, e.g., 10 to 65 μsec.

The rising edge of the TOP_L signal (time t13) is ahead of the next first timing edge of the BD_L signal (time t14) by a time period T12 (e.g., 10 to 65 μsec).

Timings of the VDO1 and VDO2 signals in a case where the TOP_L signal is present (FIG. 5B) are the same as those in a case where there is no TOP_L signal (FIG. 5A).

Figure 6:
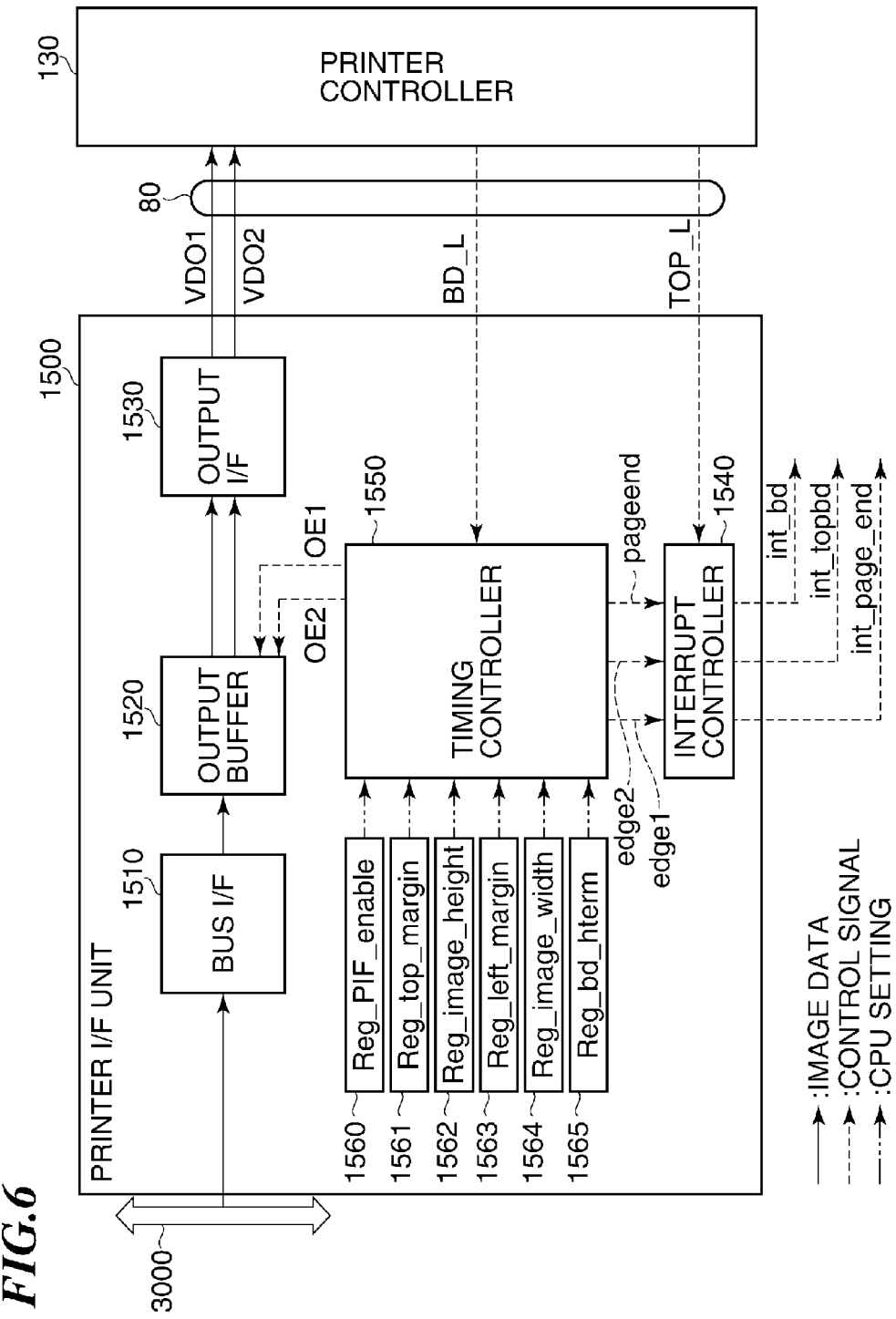
FIG. 6 is a block diagram schematically showing the construction of a printer I/F unit of the main controller.

FIG. 6 schematically shows in block diagram the construction of the printer I/F unit 1500 of the main controller 100 shown in FIG. 4.

The printer I/F unit 1500 includes a bus I/F 1510, which is connected to the controller's internal bus 3000. The bus I/F 1510 receives, on a per line basis, image data to be transmitted to the printer controller 130. An output buffer 1520 is implemented by a line memory such as a SRAM, and holds, on a per line basis, the image data to be transmitted. In time with an OE (output enable) signal supplied from a timing controller 1550, the output buffer 1520 outputs the image data held therein to an output I/F 1530 on a per pixel basis. The output I/F 1530 outputs the image data received from the output buffer 1520 to the printer controller 130.

An interrupt controller 1540 (page top detection unit) generates a page top detection interrupt signal int_bd or int_topbd, and generates a page output completion interrupt signal int pageend that represents completion of output of effective image for one page.

The timing controller 1550 is a timing control unit for controlling emission timings of light beams from the first and second laser units 2, 3 based on the received BD_L signal. The timing controller 1550 generates and outputs output enable signals for the image data held in the output buffer 1520. In the following, an output enable signal that corresponds to an image signal for an odd-numbered line (VDO1 signal) will be referred to as the OE1 signal, and an output enable signal that corresponds to an image signal for an even-numbered line (VDO2 signal) will be referred to as the OE2 signal.

The timing controller 1550 generates and outputs edge1 and edge2 signals that represent first and second timing edges of the BD_L signal, respectively. Parameters used to generate the OE1 and OE2 signals are set in the registers described below.

Under the control of the CPU 1000, an enable signal for the timing controller 1550 is input into a Reg_PIF_enable register 1560. A Reg_top_margin register 1561 is set with a position in the sub-scanning direction at which effective image output is to be started and which is represented by the number of lines counted from the top of a page.

A Reg_image_height register 1562 is set with an effective image height, which is represented by the number of lines. A Reg_left_margin register 1563 is set with a position in the main scanning direction at which effective image output is to be started and which is represented by the number of pixels counted from a BD_L signal assert. A Reg_image_width register 1564 is set with an effective image width.

A Reg_bd_hterm register 1565, by which this embodiment is characterized, is set with an identification parameter for identifying whether a BD_L signal assertion indicates a first timing edge or a second timing edge of the BD_L signal.

Figure 7:
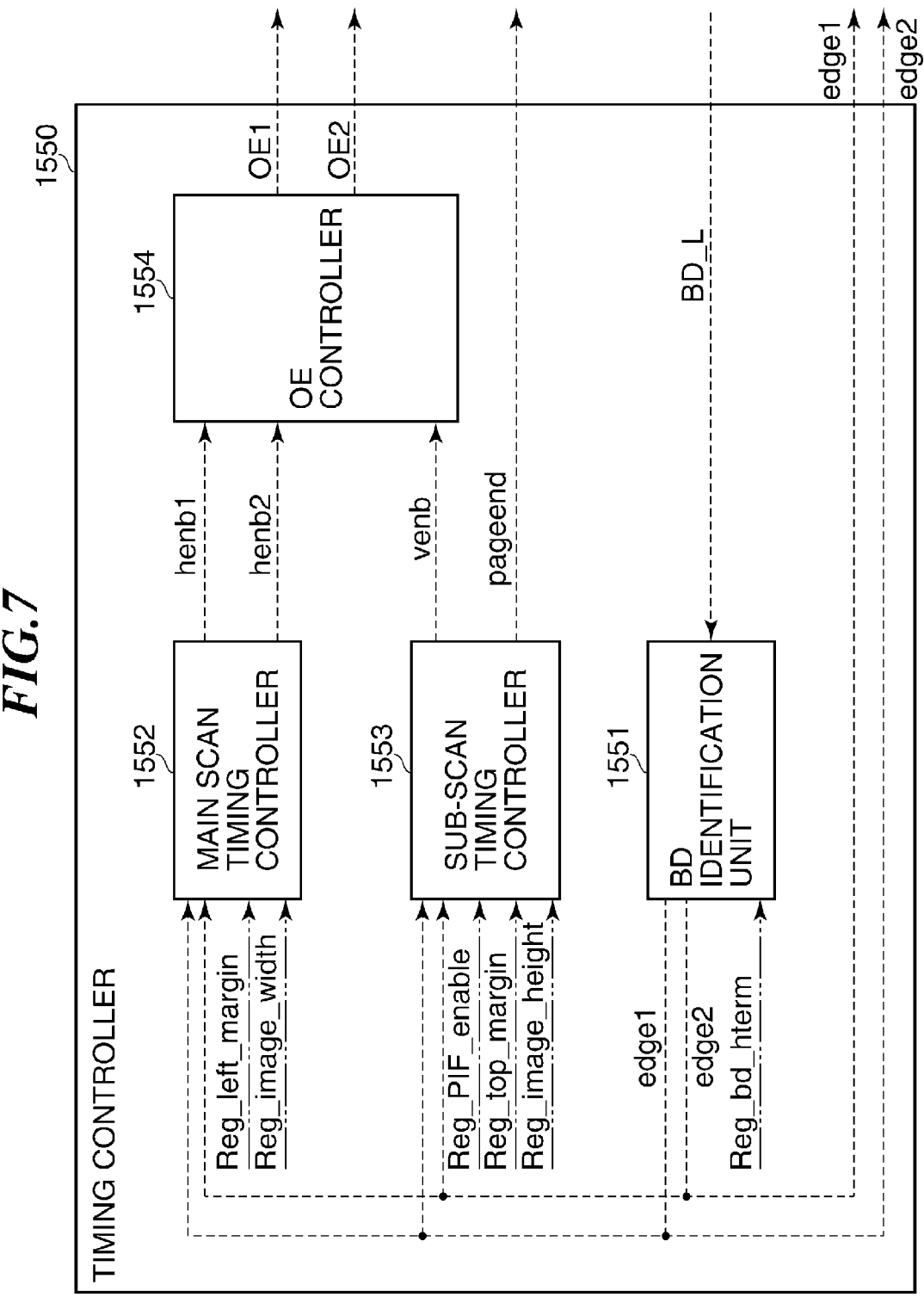
FIG. 7 is a block diagram schematically showing the construction of a timing controller of the printer I/F unit.

FIG. 7 schematically shows in block diagram the construction of the timing controller 1550.

A BD identification unit 1551 (main scanning sync signal identification unit and detection unit) of the timing controller 1550 is connected to the Reg_bd_hterm register 1565, and identifies the first and second timing edges of the BD_L signal from each other based on the identification parameter set in the register 1565. The BD identification unit 1551 outputs an edge1 signal when identifying the first timing edge of the BD_L signal, and outputs an edge2 signal when identifying the second timing edge of the BD_L signal.

A main scan timing controller 1552 creates a henb1 signal which is a main scanning direction output enable signal for the VDO1 signal, and creates a henb2 signal which is a main scanning direction output enable signal for the VDO2 signal. The henb1 signal is set to be enabled when the Reg_left_margin is counted from an edge1 signal assert, and set to be disabled when the sum of Reg_left_margin and Reg_image_width is counted. The henb2 signal is set to be enabled when the Reg_left_margin is counted from an edge2 signal assert, and set to be disabled when the sum of Reg_left_margin and Reg_image_width is counted.

A sub-scan timing controller 1553 generates a venb signal which is a sub-scanning direction output enable signal, and generates a pageend signal representing that the output of effective image for one page has been completed.

An OE controller 1554 generates OE1 and OE2 signals based on the henb1 and henb2 signals generated by the main scan timing controller 1552 and the venb signal generated by the sub-scan timing controller 1553. The OE1 signal is set to be enabled when both the henb1 signal and the venb signal are set to be enabled. Otherwise, the OE1 signal is set to be disabled. The OE2 signal is set to be enabled when both the henb2 signal and the venb signal are set to be enabled. Otherwise, the OE2 signal is set to be disabled.

Figure 8:
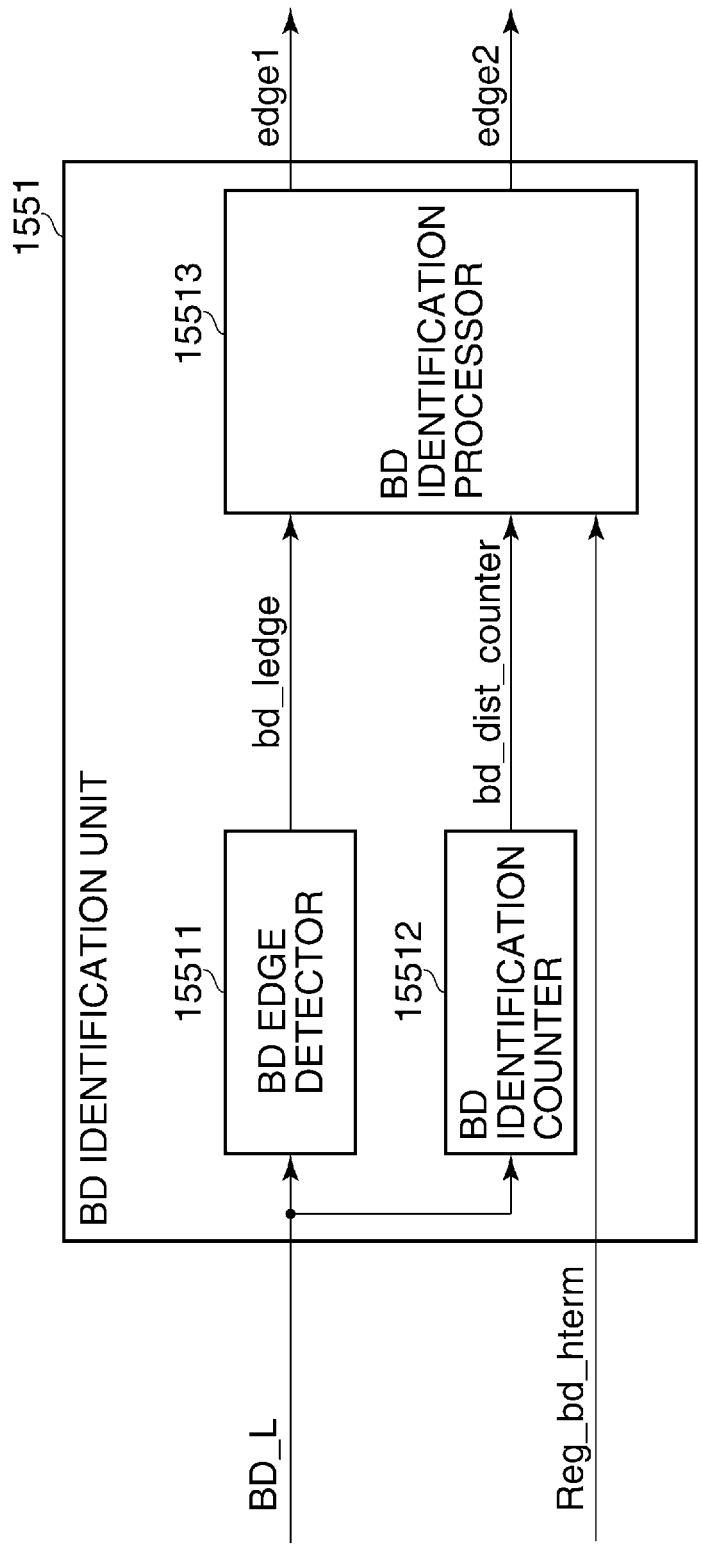
FIG. 8 is a block diagram schematically showing the construction of a BD identification unit of the timing controller.

FIG. 8 schematically shows in block diagram the construction of the BD identification unit 1551 of the timing controller 1550 shown in FIG. 7.

The BD identification unit 1551 is constituted by three modules described below.

A BD edge detector 15511 (edge detection unit) outputs a bd_ledge signal when detecting a falling edge of the BD_L signal.

A BD identification counter 15512 (identification counter) outputs a counter value, bd_dist_counter, that is incremented one by one when the BD_L signal is at H level and cleared when the BD_L signal is at L level.

A BD identification processor 15513 is constituted by a comparator. The processor 15513 asserts the edge1 signal, if a counter value, bd_dist_counter, of the BD identification counter 15512 at the time of the bd_ledge signal being asserted is equal to or greater than an identification parameter value set in the Reg_bd_hterm register 1565. If the counter value bd_dist_counter is less than the identification parameter value set in the register 1565, the BD identification processor 15513 asserts the edge2 signal. The details will be described below with reference to FIG. 9.

Figure 9:
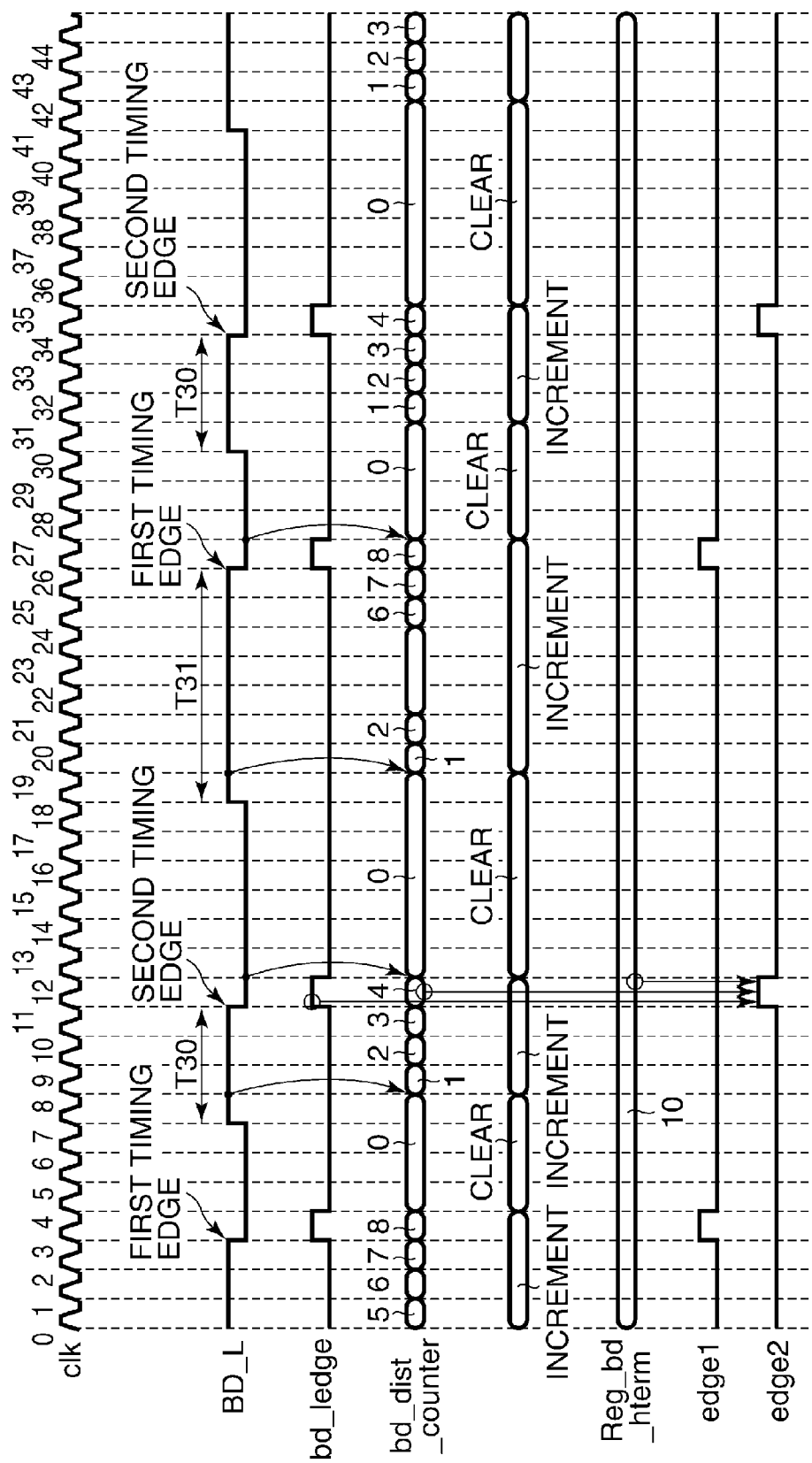
FIG. 9 is a timing chart showing operation of the BD identification unit.

FIG. 9 shows, in timing chart, operation of the BD identification unit 1551.

In this embodiment, a time period 130 during which the BD_L signal after the detection of first timing edge1 is at an H level is set to 400 nsec, a time period T31 during which the BD_L signal after the detection of second timing edge is at an H level is set to 100 μsec, and the frequency of the reference clock of the BD identification unit 1551 is set to 10 MHz. The Reg_bd_hterm register 1565 is set with an identification parameter value (in terms of counter value bd_dist_counter) corresponding to a time period longer than T30 and shorter than T31.

During a time period from clk 8 to clk 11, since the BD_L signal is at H level, the counter value bd_dist_counter of the BD identification counter 15512 is incremented one by one. When clk 12 raises, a falling edge of the BD_L signal is detected. The BD identification processor 15513 compares the counter value bd_dist_counter with the value set in the Reg_bd_hterm register 1565. Since the counter value bd_dist_counter is smaller than the value set in the Reg_bd_hterm register 1565, the edge2 signal is asserted. Furthermore, since the BD_L signal is at L level, the counter value bd_dist_counter is cleared to 0.

When clk 19 raises, the BD_L signal is raised to H level and the counter value bd_dist_counter is incremented one by one until clk 26 falls. When clk 27 raises, the falling edge of the BD_L signal is detected. The BD identification processor 15513 compares the counter value bd_dist_counter with the value set in the Reg_bd_hterm register 1565. Since the counter value bd_dist_counter is equal to or greater than the value set in the Reg_bd_hterm register 1565, the edge1 signal is asserted. In this manner, the first and second timing edges of the BD_L signal are discriminated from each other by using the time length difference between the H level time periods T30, T31 of the BD_L signal.

Figure 10:
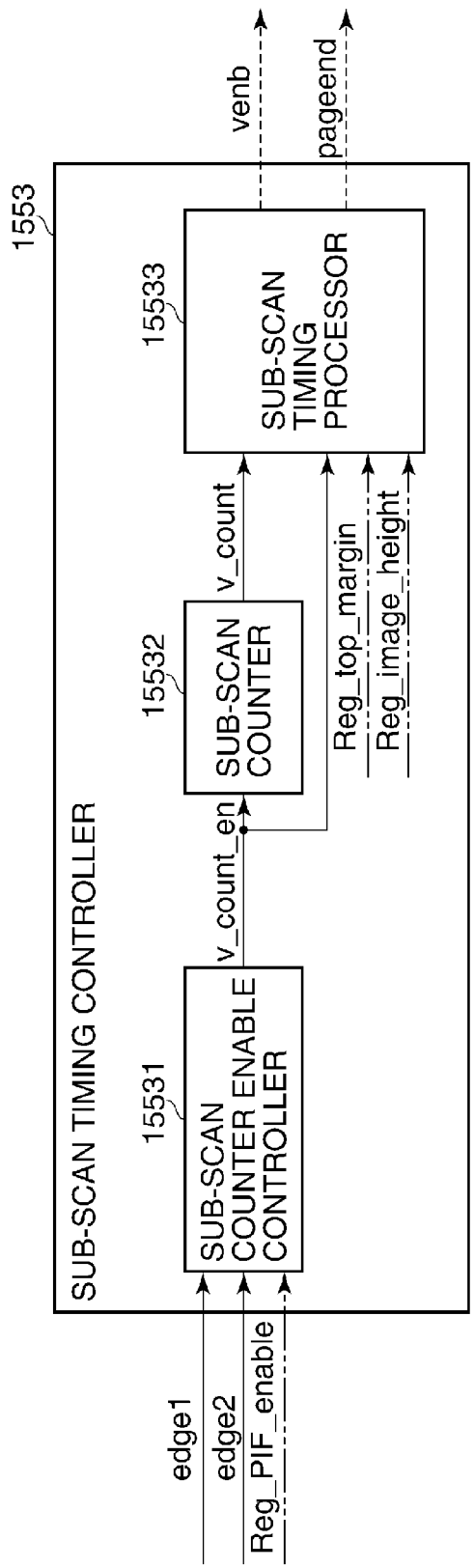
FIG. 10 is a block diagram schematically showing the construction of a sub-scan timing controller of the timing controller.

FIG. 10 schematically shows the construction of the sub-scan timing controller 1553 shown in FIG. 7.

The sub-scan timing controller 1553 is constituted by three modules, which are described below.

When the edge1 signal, which is an identification signal representing a sync signal for light beam for odd-numbered line, is input from the BD identification unit 1551 for the first time, a sub-scan counter enable controller 15531 starts counting up and generates a v_count_en signal, which is a count-up enable signal for the sub-scan counter 15532.

The sub-scan counter 15532 counts the number of lines in the sub-scanning direction. A counter value V_count of the counter 15532 is incremented when the v_count_en signal is asserted, and cleared to 0 when the printer I/F unit 1500 is initialized.

A sub-scan timing processor 15533 generates a venb signal, which is a sub-scanning direction output enable signal, and generates a pageend signal indicating the completion of image output for one page. The venb signal is enabled when a v_count_en signal assert is detected in a state where the counter value v_count reaches a value set in the Reg_top_margin register 1561. The venb signal is disabled when the v_count_en signal assert is detected in a state where the counter value v_count reaches the sum of values respectively set in the Reg_top_margin register 1561 and the Reg_image_height register 1562. Simultaneously, the pageend signal is asserted.

Figure 11:
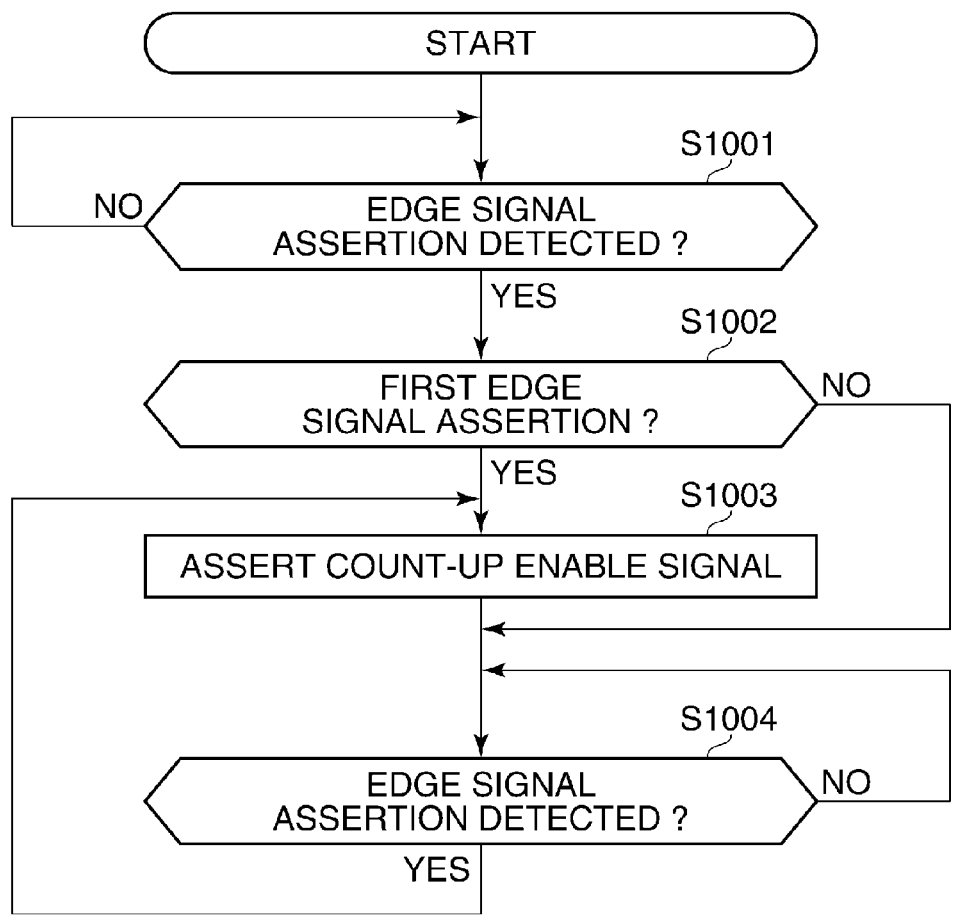
FIG. 11 is a flowchart showing a control process performed by a sub-scan counter enable controller of the sub-scan timing controller.

FIG. 11 shows in flowchart a control process performed by the sub-scan counter enable controller 15531 shown in FIG. 10.

The sub-scan counter enable controller 15531 is operable only when the Reg_PIF_enable is set to be enabled (during when the Reg_PIF_enable is asserted).

In step S1001, the sub-scan counter enable controller 15531 waits for an edge1 signal assertion or an edge2 signal assertion being detected. When either an edge signal assertion or an edge 2 signal assertion is detected, the process proceeds to step S1002 where the sub-scan counter enable controller 15531 determines which of edge1 signal assertion and edge2 signal assertion is detected.

When determining that edge1 signal assertion is detected, the sub-scan counter enable controller 15531 asserts a v_count_en signal (count-up enable signal) in step S1003. Next, in step S1004, the sub-scan counter enable controller 15531 waits for the next edge1 signal assertion or the next edge2 signal assertion being detected. When either the next edge signal assertion or the next edge2 signal assertion is detected, the process proceeds to step S1003 where the sub-scan counter enable controller 15531 asserts the v_count_en signal.

If it is determined in step S1002 that an edge2 signal assertion is detected, the process proceeds to step S1004.

FIG. 12A shows, in timing chart, operation of the sub-scan timing controller 1553 in a case where a timing of the Reg_PIF_enable assertion is in between from a second timing edge to a first timing edge of the BD_L signal. FIG. 12B shows a timing chart in a case where an assertion timing of the Reg_PIF_enable register 1560 is in between from a first timing edge to a second timing edge of the BD_L signal.

In this embodiment, the Reg_top_margin register 1561 and the Reg_image_height register 1562 are each set with a value of 2.

The timing chart shown in FIG. 12A is first described.

At a timing of t41, the Reg_PIF_enable is asserted and the sub-scan counter enable controller 15531 starts operating.

When a first timing edge of the BD_L signal is asserted at a timing of t42, the controller 15531 identifies the first timing edge and asserts the v_count_en signal (steps S1002 and S1003 in FIG. 11). Also at a timing of t43, the controller 15531 asserts the v_count_en signal (step S1004 in FIG. 11). At a timing of t44, the sub-scan timing processor 15533 detects a v_count_en signal assertion in a state where the counter value v_count reaches a value set in the Reg_top_margin register 1561, and asserts a venb signal. At a timing of t45, the sub-scan counter enable controller 15531 asserts the v_count_en signal and counts up the counter value v_count. At a timing of t46, the sub-scan timing processor 15533 detects a v_count_en signal assertion in a state where the counter value v_count reaches the sum of values respectively set in the Reg_top_margin register 1561 and the Reg_image_height register 1562, and disasserts the venb signal.

Next, the timing chart shown in FIG. 12B is described.

At a timing of t51, a first timing edge of the BD_L signal is asserted. At a timing of t52, the Reg_PIF_enable register 1560 is asserted and the sub-scan counter enable controller 15531 starts operating. When a second timing edge of the BD_L signal is asserted at a timing of t53, the sub-scan counter enable controller 15531 identifies the second timing edge, and waits for the next edge1 signal (step S1002 and S1004 in FIG. 11). During a time period from t54 to t58, the sub-scan timing controller 1553 operates in the same manner as with the time period from t42 to t46 shown in FIG. 12A, and therefore a description thereof is omitted.

Figure 13:
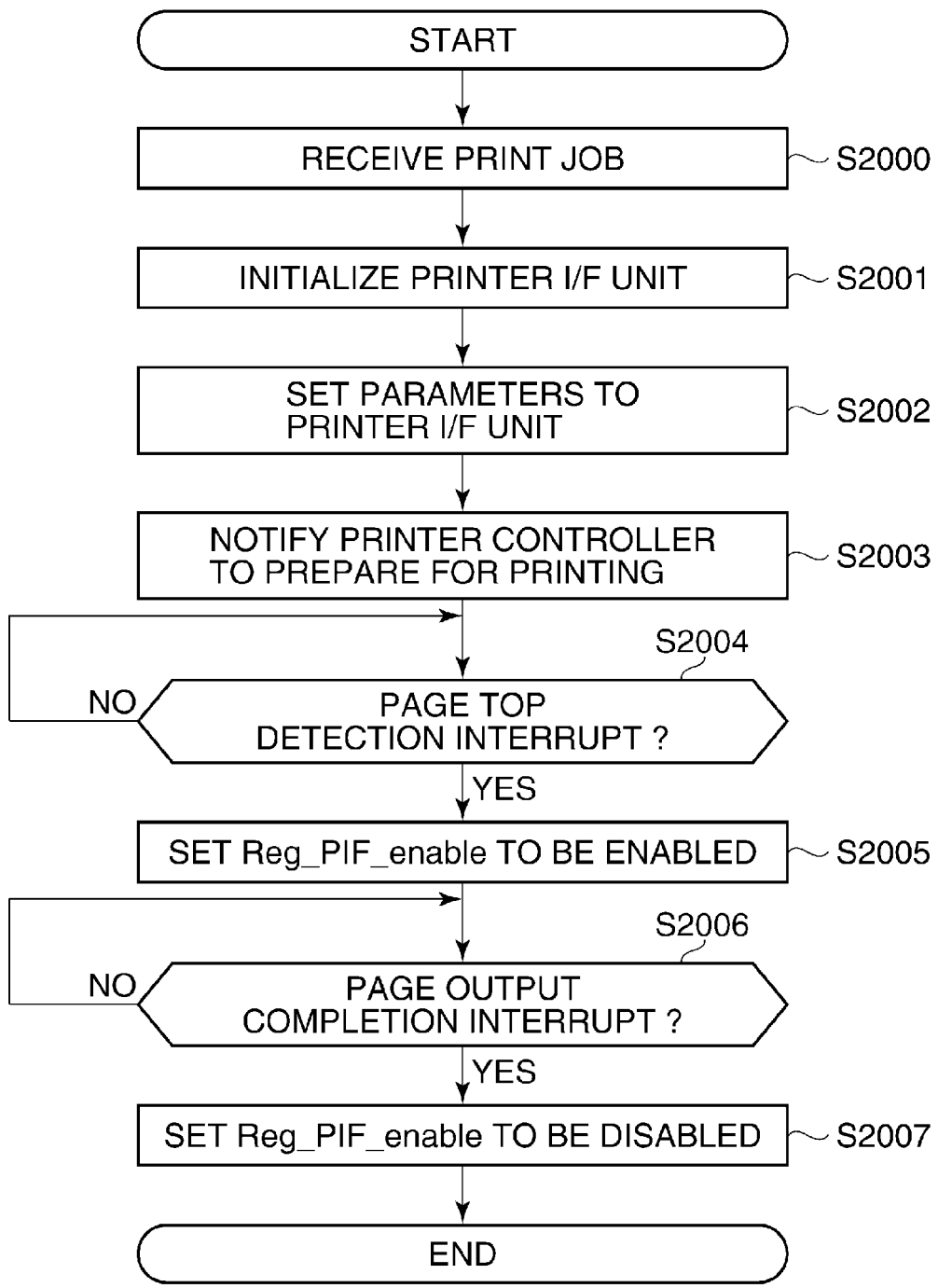
FIG. 13 is a flowchart showing an example process performed by the main controller to receive a print job from a PC and output an effective image to the printer controller.

FIG. 13 show in flowchart an example process performed by the main controller 100 to receive a print job from the PC 60 and output an effective image to the printer controller 130.

In step S2000, the external I/F 1300 of the main controller 100 detects reception of a print job from the PC 60, and notifies the CPU 1000 to that effect. In step S2001, the CPU 1000 stores an image of the received print job into the RAM 1200 and initializes the printer I/F unit 1500. If the received image has been compressed, the image is expanded by the image expansion unit 1400. Next, in step S2002, the CPU 1000 makes settings of parameters for an output image. More specifically, an image output start timing, output image size, and mode are set to the registers 1561 to 1565 shown in FIG. 6. Values to be set to the registers 1561 to 1564 are received from the host PC 60.

Values to be set to the register 1565 are determined according to the specifications of the internal communication I/F 80, and are managed by software of the image forming apparatus or received from the host PC 60.

In step S2003, the CPU 1000 notifies the printer controller 130 to prepare for printing. In step S2004, the CPU 1000 waits for reception of a page top detection interrupt signal. When a page top detection interrupt signal is received, the process proceeds to step S2005 where the Reg_PIF_enable is set to be enabled, whereby the sub-scan timing controller 1553 of the timing controller 1550 is set to be enabled.

In step S2006, the CPU 1000 waits for reception of a page output completion interrupt signal. When a page output completion interrupt signal is received, the process proceeds to step S2007 where the Reg_PIF_enable is set to be disabled, whereby the sub-scan timing controller 1553 of the timing controller 1550 is set to be disabled. Then, the present process is completed.

Figure 14A:
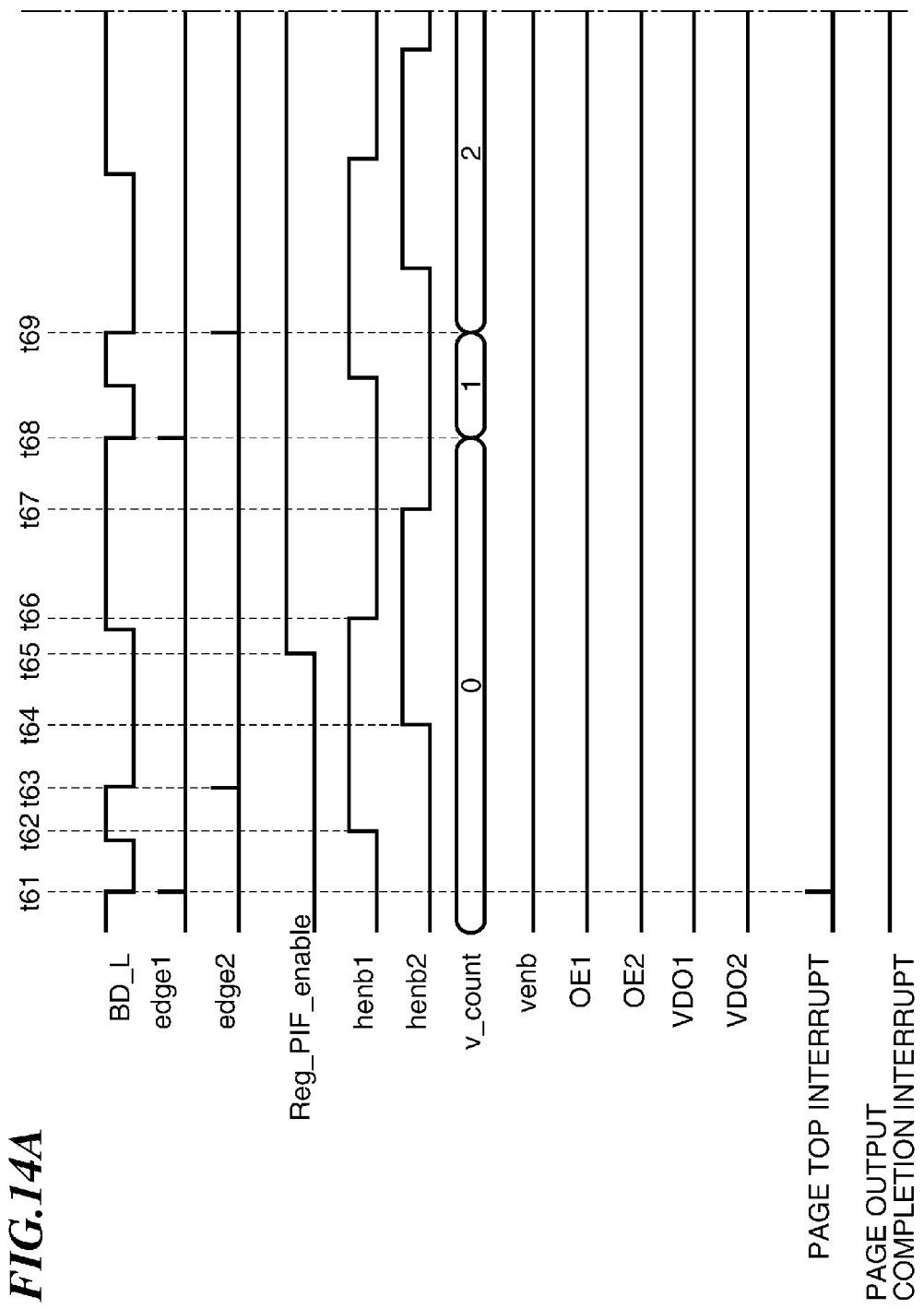
Figure 15A:
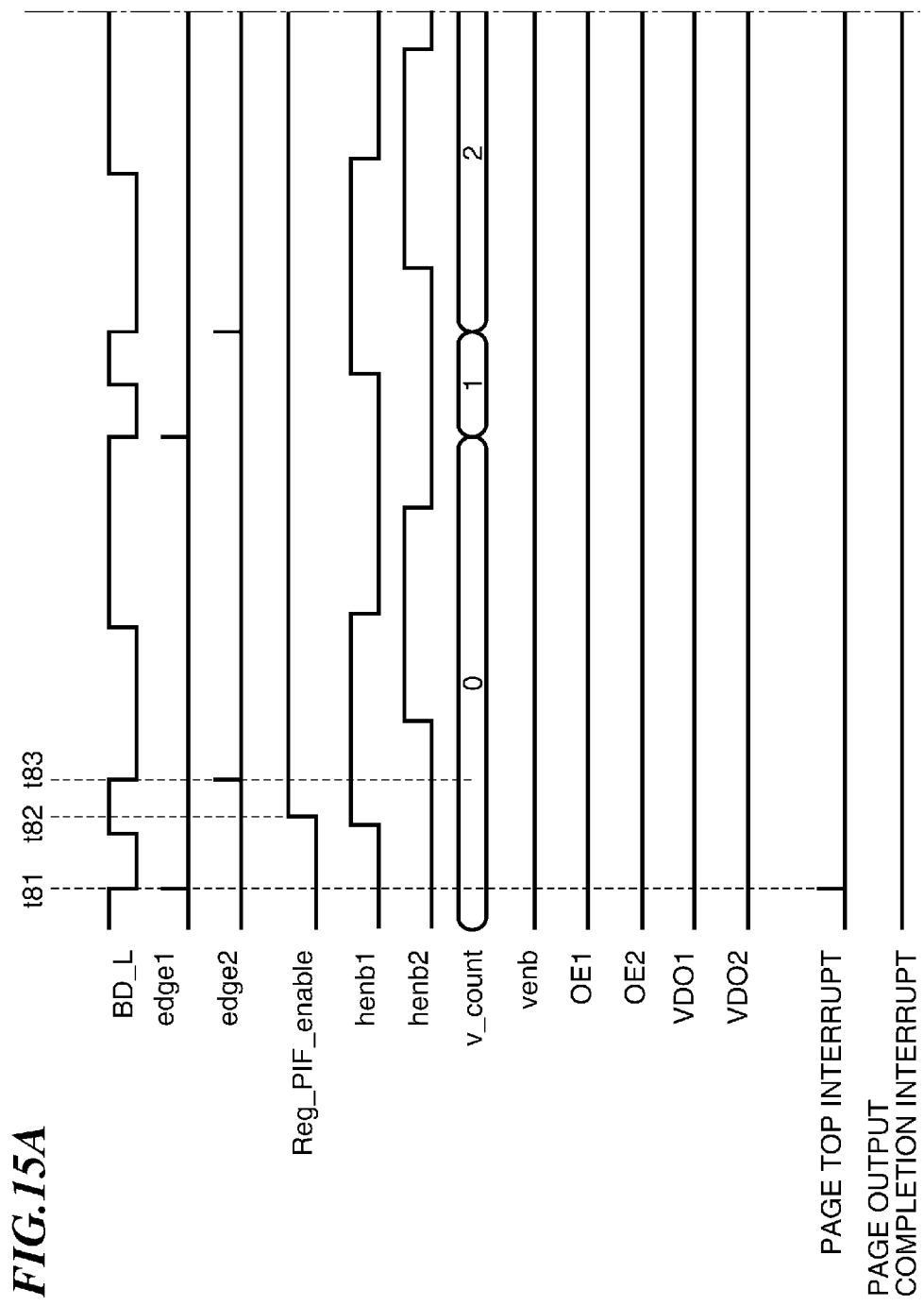

FIGS. 14A to 15B show in timing chart various signals associated with processing from page top detection to image output, the processing being performed after completion of processing in steps S2000 to S2003 in FIG. 13 in a case where there is no TOP_L signal. In the illustrated example, the Reg_top_margin register 1561 is set with a value of 2 and the Reg_image_height register 1562 is set with a value of 4. To describe control by which this embodiment is characterized, FIGS. 14A and 14B show a case where the Reg_PIF_enable is asserted during a time period from a second timing edge to a first timing edge of the BD_L signal, and FIGS. 15A and 15B show a case where the Reg_PIF_enable is asserted during a time period from a first timing edge to a second timing edge of the BD_L signal.

First, the timing chart shown in FIGS. 14A and 14B is described.

In a case where there is no TOP_L signal, a BD_L signal assertion at t61 in FIG. 14A represents the top of a page. An edge1 signal assertion is input from the timing controller 1550 to the interrupt controller 1540, and the controller 1540 asserts a page top detection interrupt signal.

The following is a description of generation timings of henb1 and henb2 signals for each line.

The main scan timing controller 1552 starts counting the Reg_left_margin when detecting the edge1 signal assertion at t61. At t62, the controller 1552 completes counting the Reg_left_margin and asserts a henb1 signal. At t66, the controller 1552 completes counting the sum of the Reg_left_margin and the Reg_image_width and disasserts the henb1 signal.

When detecting the edge2 signal assertion at t63, the main scan timing controller 1552 starts counting the Reg_left_margin. At t64, the controller 1552 completes counting the Reg_left_margin and asserts a henb2 signal.

At t67, the controller 1552 completes counting the sum of the Reg_left_margin and the Reg_image_width and disasserts the henb2 signal.

The page top detection interrupt signal is asserted by the CPU 1000 at t61, and the Reg_PIF_enable is asserted by the CPU 1000 at t65. A time period from t61 to t65 varies according to a state in which the CPU 1000 operates. Specifically, the CPU 1000 that waits for reception of the page top detection interrupt signal in step S2004 is in a state able to immediately receive the interrupt signal or in a state performing another processing and unable to immediately receive the interrupt signal. When receiving the interrupt signal, the CPU 1000 asserts the Reg_PIF_enable in step S2005, thereby setting the sub-scan timing controller 1553 to be enabled.

In FIG. 14A, the page top detection interrupt signal is shown as a pulse signal. However, in practice, the interrupt signal (pulse signal) is latched by the INTC 1600 and interrupt control is performed.

The sub-scan timing controller 1553 counts the counter value v_count at t68 and t69, and asserts the venb signal at t70 since the Reg_top_margin register 1561 is set with a value of 2 in this embodiment.

Referring to FIG. 14B, the OE controller 1554 detects a henb1 signal assertion and a venb signal assertion during a time period from t71 to t73 and asserts the OE1 signal. Also, the OE controller 1554 detects a henb2 signal assertion and a venb signal assertion during a time period from t72 to t74 and asserts the OE2 signal. When detecting the OE1 and OE2 signal assertions, the output buffer 1520 outputs VDO1 and VDO2 signals to the output I/F 1530.

At t75, the sub-scan timing controller 1553 disasserts the venb signal. Simultaneously, a pageend signal assertion is input from the sub-scan timing controller 1553 to the interrupt controller 1540. The interrupt controller 1540 asserts a page output completion interrupt signal.

When receiving the page output completion interrupt signal in step S2006 of FIG. 13, the CPU 1000 disables the Reg_PIF_enable at t76, thereby disabling the sub-scan timing controller 1553 (step S2007).

Next, the timing chart shown in FIGS. 15A and 15B is described.

In FIGS. 14A and 14B, a timing of the Reg_PIF_enable assertion is in between from a second timing edge to a first timing edge of the BD_L signal. On the other hand, in FIGS. 15A and 15B, the Reg_PIF_enable is asserted between a first timing edge of the BD_L signal shown at t81 and a second timing edge of the BD_L signal shown at t83.

This embodiment is characterized by the operation of the sub-scan timing controller 1553 that does not count up the counter value v_count (as shown by count-up mask at t53 in FIG. 12B). On and after t83, respective signals are processed at timings similar to those shown in FIGS. 14A and 14B.

In a case where the CPU 1000 is capable of immediately performing processing from a BD_L signal assertion (detection of the page top detection interrupt signal) to the setting to enable the sub-scan timing controller 1553 by setting the Reg_PIF_enable to be on (enabled), respective signals are processed at timings shown in FIGS. 15A and 15B. On the other hand, in a case where the CPU 1000 is performing another interrupt processing when the page top detection interrupt signal is asserted, so that it takes a long time to perform the processing from the interrupt signal detection to the setting to make the Reg_PIF_enable to be on (enabled), respective signals are processed at timings shown in FIGS. 14A and 14B.

As described above, even if a timing where the Reg_PIF_enable is asserted changes depending on the interrupt processing operation of the CPU 1000, a timing of image output based on the VDO1 and VDO2 signals can be made constant. It is therefore possible to prevent a deviation from occurring between image writing start positions of respective color plane images.

Second Embodiment

A second embodiment of this invention has the same structure as that of the first embodiment shown in FIGS. 1 to 4, 6, 7 and 10. Like elements similar to those of the first embodiment are denoted by like numerals, and a description thereof is omitted. In the following, a description will only be given of points different from the first embodiment.

Figure 16A:
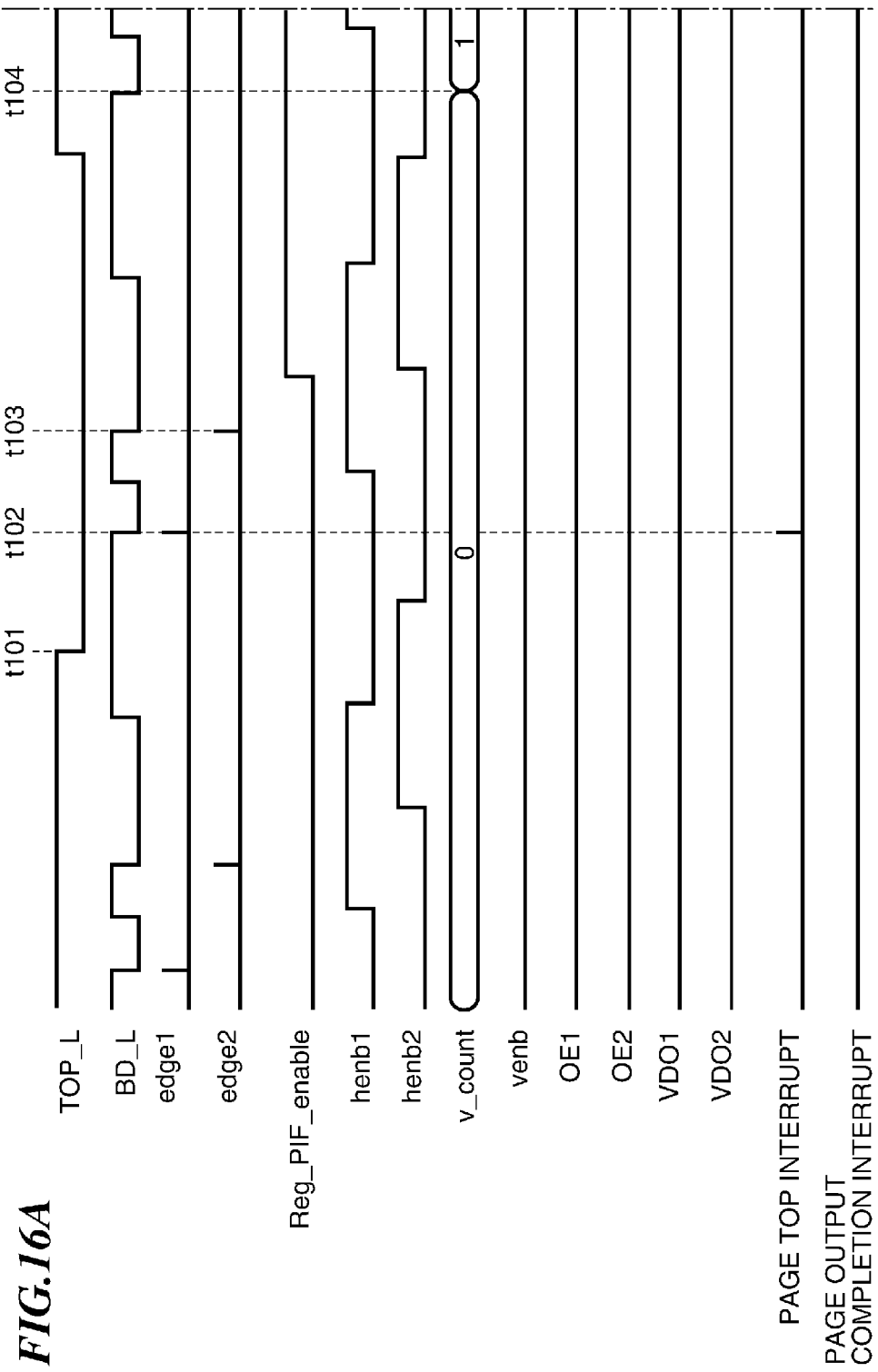

FIGS. 16A and 16B are a timing chart of various signals associated with processing from page top detection to image output in the second embodiment, the processing being performed after completion of steps S2000 to S2003 in FIG. 13 in a case where there is a TOP_L signal. In the illustrated example, the Reg_top_margin is set with a value of 2 and the Reg_image_height is set with a value of 2.

At t101, a TOP_L signal (sub-scanning sync signal) is asserted. A BD_L signal (main scanning sync signal) is detected prior to t101. This embodiment is characterized in that a page top detection interrupt signal is not asserted at a timing of t101, even if the TOP_L signal assertion is detected at t101.

At a timing of t102 where a TOP_L signal is asserted and a first timing edge of the BD_L signal is detected, the interrupt controller 1540 generates a page top detection interrupt signal int_topbd. In other words, in a case where there is a TOP_L signal, the interrupt controller 1540 asserts the page top detection interrupt signal when both an edge1 signal input from the timing controller 1550 and the TOP_L signal input from the printer controller 130 are asserted.

On and after t102, respective signals are processed at timings similar to those shown in FIGS. 14A and 14B. At t102, the page top detection interrupt signal is detected by the CPU 1000. Then, the Reg_PIF_enable is asserted. At t104, the counter value v_count is started to be counted up.

Conventionally, a TOP_L signal is detected as a page top detection interrupt signal. In that case, it is not possible to know when the Reg_PIF_enable is asserted during the time period from t101 to t103, resulting in a variation in the timing to start counting up the counter value v_count. For example, printing start positions of color plane images are deviated by two lines between when the Reg_PIF_enable is asserted between t101 and t102 and when the Reg_PIF_enable is asserted between t103 and t104.

According to this embodiment, it is possible to control the timing to assert the page top detection interrupt signal. In addition, it is possible to control the timing to start counting up the counter value v_count in the sub-scanning direction, even if the timing of the Reg_PIF_enable assertion varies. Thus, the timing of image output based on the VDO1 and VDO2 signals can be made constant. It is therefore possible to prevent a deviation from occurring between image writing start positions of respective color plane images.

Third Embodiment

A third embodiment of this invention has the same structure as that of the first embodiment shown in FIGS. 1 to 4, 6, 7 and 10. Like elements similar to those of the first embodiment are denoted by like numerals, and a description thereof is omitted. In the following, a description will only be given of points different from the first embodiment.

FIGS. 17A to 18B are timing charts of various signals associated with processing from page top detection to image output in the third embodiment, the processing being performed after completion of steps S2000 to S2003 in FIG. 13. More specifically, these timing charts describe a case where the timing to assert the page top detection interrupt signal is changed to at a second timing edge of the BD_L signal.

Figure 17A:
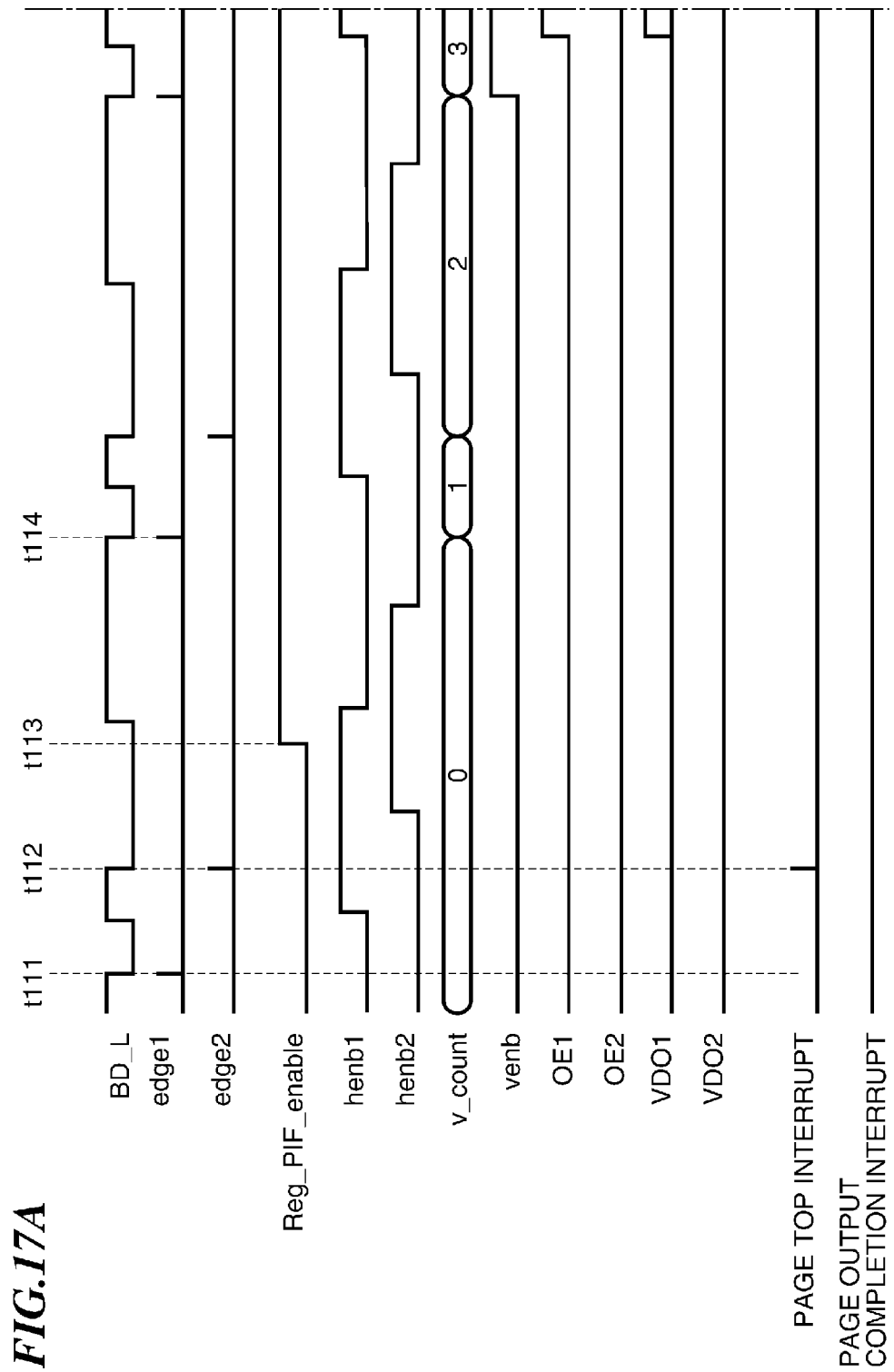

First, with reference to FIGS. 17A and 17B, a description will be given of a case where there is no TOP_L signal.

In the first embodiment (FIGS. 14A to 15B), the interrupt controller 1540 asserts a page top detection interrupt signal when a BD_L signal assertion is input for the first time in a case where there is no TOP_L signal. On the other hand, in this embodiment, the interrupt controller 1540 does not assert a page top detection interrupt signal at a timing (t1l1 in FIG. 17A) where the first BD_L signal representing the top of a page is asserted in a case where there is no TOP_L signal.

At t112, an edge2 signal assertion is input from the timing controller 1550 to the interrupt controller 1540, and the interrupt controller 1540 asserts the page top detection interrupt signal. At t113, the CPU 1000 asserts the Reg_PIF_enable. At t114, the CPU 1000 receives an edge1 signal which is a sync signal for the next odd-numbered line output.

According to this embodiment, it is always possible to assert the Reg_PIF_enable between from a second timing edge to a first timing edge of the BD_L signal. As previously described with reference to FIGS. 5A and 5B, the time period from t1l1 to t112 is several hundred nsec, whereas the time period from t112 to t114 is several hundred μsec. Thus, a time period from when the CPU 1000 detects the page top detection interrupt signal to when the Reg_PIF_enable is asserted is less than several hundred μsec, and it is therefore possible to assert the Reg_PIF_enable between from a second timing edge to a first timing edge of the BD_L signal. With this construction, the sub-scan counter enable controller 15531 can have a simple structure such as to assert the v_count_en signal at the time of the edge1 signal assertion or at the time of the edge2 signal assertion.

Figure 18A:
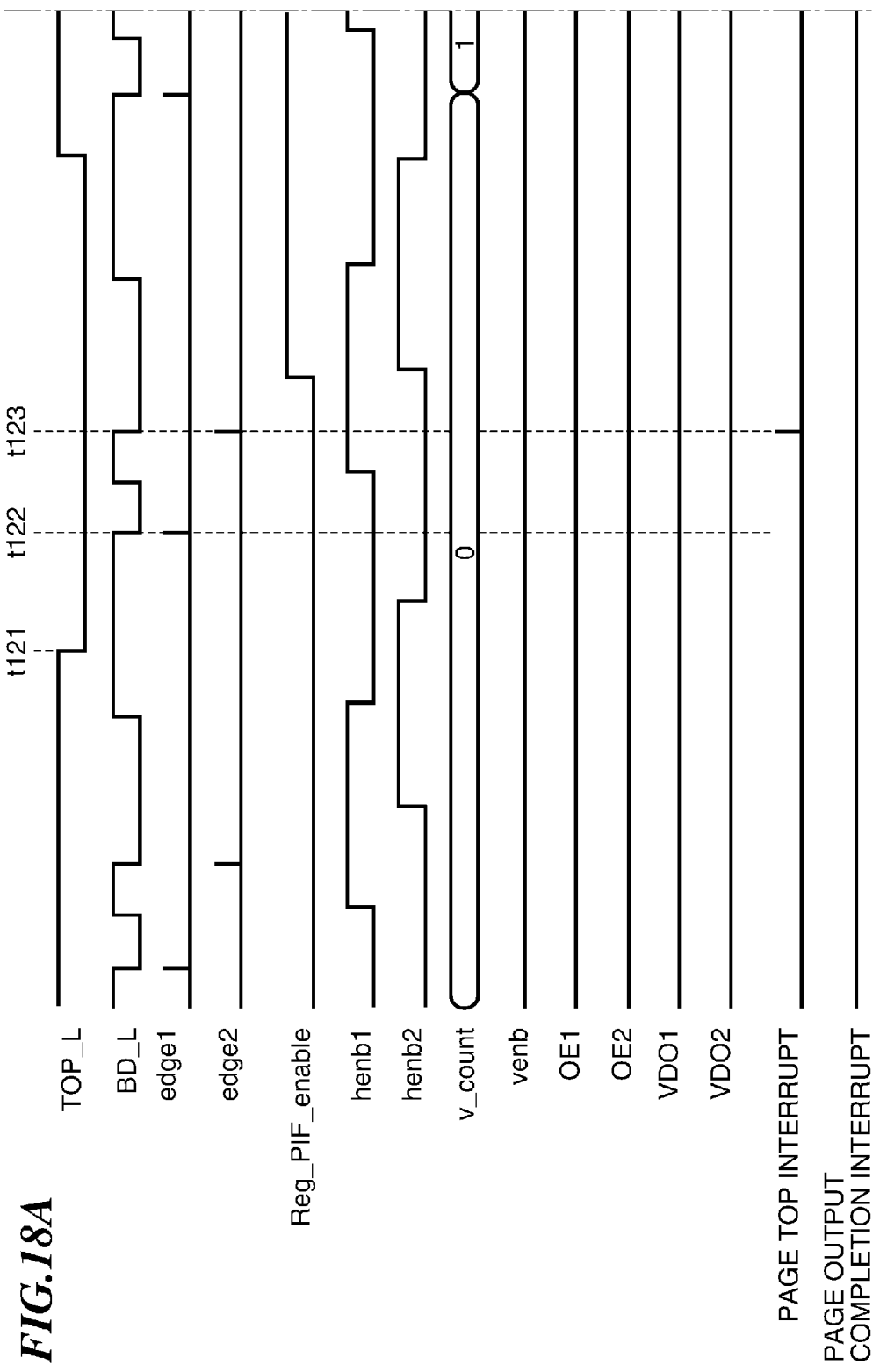
Figure 19:
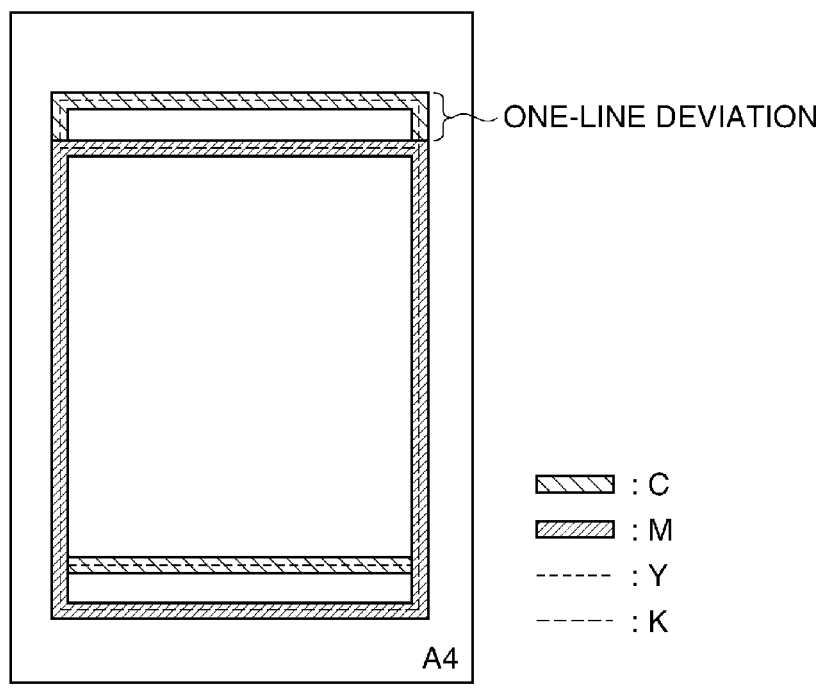
FIG. 19 is a view showing a printed image in which a line registration error is caused.

Next, with reference to FIGS. 18A and 18B, a description will be given of a case where there is a TOP_L signal.

In the second embodiment (FIGS. 16A and 16B), the interrupt controller 1540 asserts the page top detection interrupt signal at a timing when the TOP_L signal is asserted and a first timing edge of the BD_L signal is detected. On the other hand, in this embodiment, the TOP_L signal (sub-scanning sync signal) is asserted at t121 in FIG. 18A, and a first timing edge of the BD_L signal is detected at t122. However, the interrupt controller 1540 does not assert the page top detection interrupt signal at the timing of t122.

At t123, the TOP_L signal is asserted and an edge2 signal assertion is input from the timing controller 1550 to the interrupt controller 1540. The interrupt controller 1540 asserts the page top detection interrupt signal. On and after t123, respective signals are processed at timings similar to those shown in FIGS. 17A and 17B.

According to this embodiment, it is always possible to assert the Reg_PIF_enable between from a second timing edge to a first timing edge of the BD_L signal, as previously described with reference to FIGS. 17A and 17B. This is because, as previously described with reference to FIGS. 5A and 5B, the time period from t1 to t112 is several hundred nsec, whereas the time period from t112 to t114 is several hundred μsec. Thus, a time period from when the CPU 1000 detects the page top detection interrupt signal to when the Reg_PIF_enable is asserted is less than several hundred μsec, and it is therefore possible to assert the Reg_PIF_enable between from a second timing edge to a first timing edge of the BD_L signal. With this construction, the sub-scan counter enable controller 15531 can have a simple structure such as to assert the v_count_en signal at the time of the edge1 signal assertion or at the time of the edge2 signal assertion.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146370, filed Jun. 28, 2010, which is hereby incorporated by reference herein in its entirety.

What is claimed is:

1. An image forming apparatus comprising:
an image forming unit configured to expose and scan in lines across a single photosensitive body with plural light beams based on an image signal, thereby forming an electrostatic latent image on the photosensitive body, and configured to develop the electrostatic latent image and transfer a developed image onto a transfer member, thereby forming an image on the transfer member;
an identification unit configured to identify whether a main scanning sync signal is a sync signal for light beam for odd-numbered line or a sync signal for light beam for even-numbered line and output an identification signal;
a control unit configured to control an output timing of the image signal to said image forming unit according to the identification signal output from said identification unit;
a detection unit configured to detect, as page top, the identification signal input first from said identification unit; and
an enabling unit configured to make said control unit enabled when the page top is detected by said detection unit,
wherein in a case where the identification signal input from said identification unit after said control unit is made enabled by said enabling unit is the identification signal representing the sync signal for light beam for the even-numbered line, said control unit controls the output timing of the image signal according to the identification signal representing the sync signal for next input light beam for the odd-numbered line.

2. The image forming apparatus according to claim 1, wherein the main scanning sync signal is a single main scanning sync signal into which main scanning sync signals for respective ones of the plural light beams are shaped.

3. The image forming apparatus according to claim 1, wherein said identification unit includes an edge detection unit configured to detect a falling edge of waveform of the main scanning sync signal, and an identification counter configured to be counted up when the main scanning sync signal is at an H level and cleared when the main scanning sync signal is at an L level,
in a case where a value of said identification counter is less than a value used to identify whether the main scanning sync signal is asserted at a first timing edge or at a second timing edge, said identification unit determines that the main scanning sync signal is the sync signal for light beam for the even-numbered line when the falling edge of the main scanning sync signal is detected, and
in a case where the value of said identification counter is equal to or greater than the value used to identify whether the main scanning sync signal is asserted at the first timing edge or at the second timing edge, said identification unit determines that the main scanning sync signal is the sync signal for light beam for the odd-numbered line when the falling edge of the main scanning sync signal is detected.

4. The image forming apparatus according to claim 1, wherein said control unit includes:
a sub-scan counter enable control unit configured to be enabled by said enabling unit and to start a count-up enable signal assertion when the identification signal representing the sync signal for light beam for the odd-numbered line is first input from said identification unit;
a sub-scan counter configured to count up a number of lines in a sub-scanning direction each time the count-up enable signal input from said sub-scan counter enable control unit is asserted; and
a sub-scan timing processing unit configured to generate an output enable signal in the sub-scanning direction based on a value of said sub-scan counter, a parameter indicating an effective image output starting position in the sub-scanning direction represented by the number of lines counted from the page top, and a parameter indicating a height of an effective image represented by the number of lines.

5. The image forming apparatus according to claim 1, wherein said detection unit detects, as the page top, the identification signal that is input following the identification signal input first from said identification unit.

6. The image forming apparatus according to claim 1, wherein when a sub-scanning sync signal is asserted, said detection unit detects, as the page top, the identification signal input from said identification unit in a case where the input identification signal is the sync signal for light beam for the odd-numbered line.

7. The image forming apparatus according to claim 1, wherein when a sub-scanning sync signal is asserted, said detection unit detects, as the page top, the identification signal input from said identification unit in a case where the input identification signal is the sync signal for light beam for the even-numbered line.

8. A control method for an image forming apparatus having an image forming unit for exposing and scanning in lines across a single photosensitive body with plural light beams based on an image signal, thereby forming an electrostatic latent image on the photosensitive body, and for developing the electrostatic latent image and transferring a developed image onto a transfer member, thereby forming an image on the transfer member, comprising:

an identification step of identifying whether a main scanning sync signal is a sync signal for light beam for odd-numbered line or a sync signal for light beam for even-numbered line and outputting an identification signal;

a control step of controlling an output timing of the image signal to the image forming unit according to the identification signal output in said identification step;

a detection step of detecting, as page top, the identification signal input first in said identification step; and an enabling step of making said control step enabled when the page top is detected in said detection step, wherein in a case where the identification signal input in said identification step after said control step is made enabled in said enabling step is the identification signal representing the sync signal for light beam for the even-numbered line, the output timing of the image signal is controlled in said control step according to the identification signal representing the sync signal for next input light beam for the odd-numbered line.

9. A non-transitory computer-readable storage medium storing a program for causing an image forming apparatus to execute the control method as set forth in claim 8.

* * * * *